US010122276B2

(12) United States Patent
Deboy et al.

(10) Patent No.: US 10,122,276 B2
(45) Date of Patent: Nov. 6, 2018

(54) METHOD FOR OPERATING A POWER CONVERTER CIRCUIT AND POWER CONVERTER CIRCUIT

(71) Applicant: Infineon Technologies Austria AG, Villach (AT)

(72) Inventors: Gerald Deboy, Klagenfurt (AT); Kennith Kin Leong, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days.

(21) Appl. No.: 15/468,917

(22) Filed: Mar. 24, 2017

(65) Prior Publication Data
US 2017/0194866 A1    Jul. 6, 2017

Related U.S. Application Data

(62) Division of application No. 14/657,974, filed on Mar. 13, 2015, now Pat. No. 9,647,548.

(51) Int. Cl.
*H02M 3/158*   (2006.01)
*H02M 1/08*    (2006.01)
*H02M 1/00*    (2006.01)

(52) U.S. Cl.
CPC .......... *H02M 3/158* (2013.01); *H02M 1/083* (2013.01); *H02M 3/1584* (2013.01); *H02M 2001/0074* (2013.01)

(58) Field of Classification Search
CPC .......... H02M 1/083; H02M 3/06; H02M 3/07; H02M 2003/072; H02M 2001/0074
See application file for complete search history.

(56) References Cited

U.S. PATENT DOCUMENTS

| | | | | |
|---|---|---|---|---|
| 5,737,202 A | * | 4/1998 | Shimamori | H02J 1/10 307/82 |
| 6,218,792 B1 | * | 4/2001 | Berth | B60L 9/28 105/49 |
| 6,278,264 B1 | | 8/2001 | Burstein et al. | |
| 6,316,917 B1 | * | 11/2001 | Ohta | H02J 7/0016 320/166 |
| 6,462,522 B2 | | 10/2002 | Burstein et al. | |

(Continued)

FOREIGN PATENT DOCUMENTS

CN    101740827 A    6/2010
CN    103856041 A    6/2014

(Continued)

OTHER PUBLICATIONS

Leong, K., "Summary of the Integrated Multi-phase Buck Converter," Mar. 26, 2012, 16 pages.

(Continued)

*Primary Examiner* — Yusef A Ahmed
(74) *Attorney, Agent, or Firm* — Slater Matsil, LLP

(57) ABSTRACT

In accordance with an embodiment, a method includes converting power by a power converter circuit having a plurality of converter cells coupled to a supply circuit. Converting the power includes a plurality of successive activation sequences and, in each activation sequence, activating at least some of the plurality of converter cells at an activation frequency. The activation frequency is dependent on at least one of an output power and an output current of the power converter circuit.

14 Claims, 16 Drawing Sheets

(56) References Cited

U.S. PATENT DOCUMENTS

| | | | | |
|---|---|---|---|---|
| 8,238,128 B2* | 8/2012 | Falk | ............... | H02M 7/44 363/124 |
| 8,536,735 B2* | 9/2013 | Yan | ............... | H02M 3/3376 307/77 |
| 9,793,803 B2* | 10/2017 | Deboy | ............... | H02M 3/158 |
| 9,812,961 B2* | 11/2017 | Shen | ............... | H02M 3/158 |
| 2004/0036452 A1 | 2/2004 | Brooks et al. | | |
| 2005/0213267 A1 | 9/2005 | Azrai et al. | | |
| 2008/0157732 A1 | 7/2008 | Williams | | |
| 2009/0128158 A1* | 5/2009 | Kawai | ............... | B60L 3/0046 324/433 |
| 2011/0128761 A1 | 6/2011 | Ripley | ............... | H02M 3/07 363/62 |
| 2011/0140535 A1* | 6/2011 | Choi | ............... | H02J 3/32 307/82 |
| 2011/0267845 A1* | 11/2011 | Ye | ............... | H02M 3/33569 363/21.02 |
| 2011/0285375 A1* | 11/2011 | Deboy | ............... | G05F 1/67 323/299 |
| 2012/0007431 A1* | 1/2012 | Jang | ............... | H02J 4/00 307/82 |
| 2013/0009700 A1* | 1/2013 | Deboy | ............... | H02J 3/383 327/581 |
| 2013/0187473 A1* | 7/2013 | Deboy | ............... | H02M 7/49 307/82 |
| 2013/0307467 A1* | 11/2013 | Carletti | ............... | H02M 1/4225 320/107 |
| 2014/0153294 A1 | 6/2014 | Deboy et al. | | |
| 2014/0175888 A1* | 6/2014 | Deboy | ............... | H02J 3/383 307/82 |
| 2014/0266131 A1* | 9/2014 | Deboy | ............... | H02M 3/1584 323/311 |
| 2015/0008748 A1* | 1/2015 | Deboy | ............... | H02J 3/383 307/77 |
| 2015/0016159 A1* | 1/2015 | Deboy | ............... | H02J 3/383 363/71 |
| 2016/0072394 A1* | 3/2016 | Deboy | ............... | H02M 3/33592 363/21.1 |
| 2016/0072395 A1* | 3/2016 | Deboy | ............... | H02M 3/33592 363/21.1 |
| 2016/0072396 A1* | 3/2016 | Deboy | ............... | H02M 3/33592 363/21.1 |
| 2016/0072397 A1* | 3/2016 | Deboy | ............... | H02M 3/33592 363/21.1 |
| 2016/0072398 A1* | 3/2016 | Deboy | ............... | H02M 3/33592 363/21.1 |
| 2016/0261205 A1* | 9/2016 | Kolar | ............... | H02M 5/458 |

FOREIGN PATENT DOCUMENTS

| | | |
|---|---|---|
| DE | 19630284 A1 | 1/1998 |
| DE | 102013220125 A1 | 4/2014 |
| KR | 101538017 B1 | 7/2015 |
| WO | 2008047374 A2 | 4/2008 |
| WO | 2012106965 A1 | 8/2012 |
| WO | 2012113248 A1 | 8/2012 |
| WO | 2012113764 A2 | 8/2012 |

OTHER PUBLICATIONS

Costinett, D. et al., "Active Balancing System for Electric Vehicles with Incorporated Low Voltage Bus," IEEE Transactions on Power Electronics, vol. 31, Issue 11, Nov. 2016, 7 pages.

Radic', A. et al., "Low-Volume Stackable Flyback Converter with Near Minimum Deviation Controller," Twenty-Nineth Annual Applied Power Electronics Conference and Exposition (APEC), Mar. 16-20, 2014, 6 pages.

* cited by examiner

METHOD FOR OPERATING A POWER CONVERTER CIRCUIT AND POWER CONVERTER CIRCUIT

This application is a divisional of U.S. application Ser. No. 14/657,974, filed on Mar. 13, 2015, which application is hereby incorporated herein by reference in its entirety.

TECHNICAL FIELD

Embodiments of the present invention relate to a method for converting electrical power and a power converter circuit, in particular, a switched-mode power converter circuit with a plurality of converter stages (converter cells).

BACKGROUND

Switched-mode power converters are widely used in automotive, industrial, consumer electronics or information technology (IT) applications for converting an input voltage into an output voltage received by a load. In many applications, such as CPU (Central Processing Unit) powering applications, it is required to generate an output voltage with a relatively low level from an input voltage having a higher voltage level.

One important issue in the design of power converters is the reduction of power losses. One promising converter topology is a multi-phase converter topology with a plurality of converter stages (converter cells) each having a cell input and a cell output, wherein each converter cell receives as a cell input voltage a share of an overall input voltage of the power converter, and wherein the cell outputs are configured to be connected in parallel.

It is desirable to further reduce the power losses in this type of multi-phase power converter.

SUMMARY

One embodiment relates to a method. The method includes, in a charging cycle of a power converter circuit, connecting a plurality of capacitors in series between input nodes of the power converter circuit, wherein the power converter circuit further comprises a plurality of converter cells, with each converter cell being connected to one of the plurality of capacitors, after the charging cycle and before activating at least one of the plurality of converter cells, reducing an electrical potential at a first input node of the at least one of the plurality of converter cells by switching on a ground switch of at least one other of the plurality converter cells, with the ground switch being connected between a second input node of the other one of the plurality of converter cells and a ground node, and activating the at least one of the plurality of converter cells to transfer electrical power from the capacitor connected to the at least one of the plurality of converter cells to an output of the power converter circuit.

One embodiment relates to a power converter circuit. The power converter circuit includes a plurality of capacitors configured to be connected in series between input nodes of the power converter circuit, a plurality of converter cells, wherein each of the plurality of converter cells is connected to one of the plurality of capacitors, and a control circuit. The control circuit is configured, in a charging cycle of the power converter circuit, to connect the plurality of capacitors in series between the input nodes of the power converter circuit, after the charging cycle and before activating at least one of the plurality of converter cells, to reduce an electrical potential at a first input node of at least one of the plurality of converter cells by switching on a ground switch of at least one other of the plurality converter cells, with the ground switch being connected between a second input node of the other one of the plurality of converter cells and a ground node, and to activate the at least one of the plurality of converter cells to transfer electrical power from the capacitor connected thereto to an output of the power converter circuit.

Another embodiment relates to a method. The method includes converting power by a power converter circuit having a plurality of converter circuits coupled to a supply circuit. Converting the power includes a plurality of successive activation sequences and, in each activation sequence, activating at least some of the plurality of converter cells at an activation frequency. The activation frequency is dependent on at least one of an output power and an output current of the power converter circuit.

Another embodiment relates to a power converter circuit. The power converter circuit includes a plurality of converter circuits coupled to a supply circuit and a control circuit. The control circuit is configured to operate the plurality of converter cells in a plurality of successive activation sequences and, in each activation sequence, to activate at least some of the plurality of converter cells at an activation frequency. The activation frequency is dependent on at least one of an output power and an output current of the power converter circuit.

BRIEF DESCRIPTION OF THE DRAWINGS

Examples are explained below with reference to the drawings. The drawings serve to illustrate the basic principle, so that only aspects necessary for understanding the basic principle are illustrated. The drawings are not to scale. In the drawings the same reference characters denote like features.

FIG. 24 which includes

FIG. 28 which includes

FIG. 31 which includes FIGS. 31A-31C shows one embodiment of a method for operating a power converter circuits at a varying activation frequency; and FIG. 32 shows another embodiment of a method for operating a power converter circuits at a varying activation frequency.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
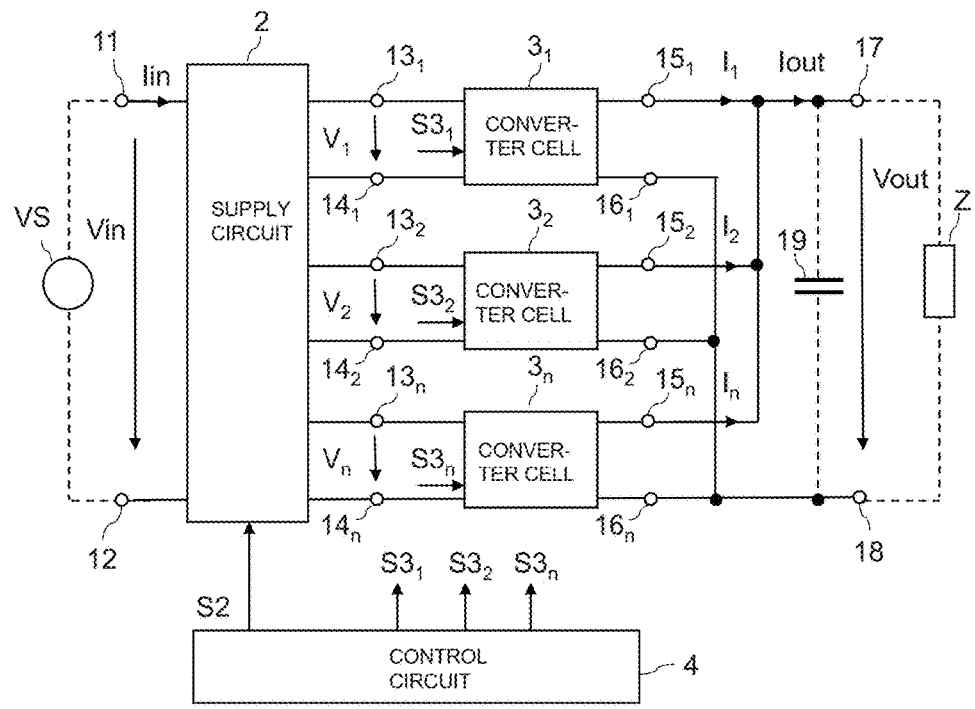
FIG. 1 illustrates one embodiment of a power converter circuit that includes a power supply circuit, a plurality of converter cells coupled to the power supply circuit, and a control circuit.

FIG. 1 illustrates one embodiment of a power converter circuit 1. The power converter circuit 1 includes an input 11, 12 for receiving an input voltage Vin and an input current Iin, and an output 17, 18 for outputting an output voltage Vout and an output current Iout. According to one embodiment, the input voltage Vin is a direct voltage (DC voltage). This input voltage Vin may be provided by a conventional power source VS (illustrated in dashed lines in FIG. 1), such as a switched-mode power supply, a battery, or the like. A voltage level of the input voltage Vin is, for example, between 5V and 100V, in particular between 10V and 60V.

The output voltage Vout and the output current Iout can be supplied to a load Z (illustrated in dashed lines in FIG. 1). According to one embodiment, the output voltage Vout is lower than the input voltage Vin. For example, the output voltage Vout is about 1.2V, 1.8V, or about 3V. For example, the load Z is a microprocessor in computer server application or a telecom application.

According to one embodiment, the power converter circuit 1 is configured to control the output voltage Vout to be substantially constant. In this case, the output current Iout may vary dependent on a power consumption of the load Z. When, for example, the input voltage Vin is substantially constant, then the input current Iin may vary dependent on the power consumption of the load Z.

The output 17, 18 includes a first output node 17 and a second output node 18 in the present embodiment. Optionally, an output capacitor 19 is coupled between the first and second output nodes 17, 18. The output voltage Vout is a voltage between the output nodes 17, 18. Equivalently, the input 11, 12 includes a first input node 11, and a second input node 12. The input voltage Vin is a voltage between the first and the second input nodes 11, 12.

According to one embodiment, the input voltage Vin and the output voltage Vout are referenced to the same circuit node, which will be referred to as ground node in the following. In this case, the second input node 12, and the second output node 18 are both connected to the ground node where a ground potential is available.

Referring to FIG. 1, the power converter circuit 1 includes a power supply circuit 2 coupled to the input 11, 12. The power supply circuit 2 is configured to receive the input voltage Vin and the input current Iin and to output a plurality of supply voltages $V_1$, $V_2$, $V_n$ from the input voltage Vin. These supply voltages $V_1$, $V_2$, $V_n$ may also be referred to as DC link voltages. Further, the power converter circuit 1 includes a plurality of converter cells $3_1$, $3_2$, $3_n$, wherein each of these converter cells $3_1$-$3_n$ receives one of the plurality of supply voltages $V_1$-$V_n$ and is configured to supply an output current $I_1$-$I_n$ to the output 17, 18. The output current Iout of the power converter circuit 1 equals the sum of the output currents $I_1$-$I_n$ of the individual converter cells $3_1$-$3_n$. The individual converter cells $3_1$-$3_n$ control their output currents $I_1$-$I_n$ such that the output voltage Vout has a predefined set-value. One way of operation of the individual converter cells $3_1$-$3_n$ is explained in further detail herein below. In the power converter circuit 1 depicted in FIG. 1, the power supply circuit 2 outputs n=3 supply voltages $V_1$-$V_n$, and n=3 converter cells $3_1$-$3_n$ are coupled to the power supply circuit 2. However, this is only an example. The number n of converter cells implemented in the power converter circuit 1 is arbitrary and not limited to n=3.

Referring to FIG. 1, each of the converter cells $3_1$-$3_n$ includes a cell input with a first input node $13_1$-$13_n$ and a second input node and receives one of the supply voltages $V_1$-$V_n$ at the respective cell input. Furthermore, each of the plurality of converter cells $3_1$-$3_n$ includes a cell output with a first output node $15_1$-$15_n$ and a second output node $16_1$-$16_n$. The first output nodes $15_1$-$15_n$ of the individual converter cells $3_1$-$3_n$ are coupled to the first output node 17 of the power converter circuit 1, and second output nodes $16_1$-$16_n$ are coupled to the second output node 18 of the power converter circuit 1.

Referring to FIG. 1, a control circuit 4 controls the operation of the supply circuit 2 and of the individual converter cells $3_1$-$3_n$. In FIG. 1, control signals S2, $S3_1$-$S3_n$ received by the supply circuit 2 and by the individual converter cells $3_1$-$3_n$, respectively, are only schematically illustrated. Dependent on the specific implementation of the supply circuit 2 and of the individual converter cells $3_1$-$3_n$ each of these circuits may receive two or more control signals, so that the control signal S2, $S3_1$-$S3_n$ illustrated in FIG. 1 may each represent one control signal or two or more control signals.

Figure 2:
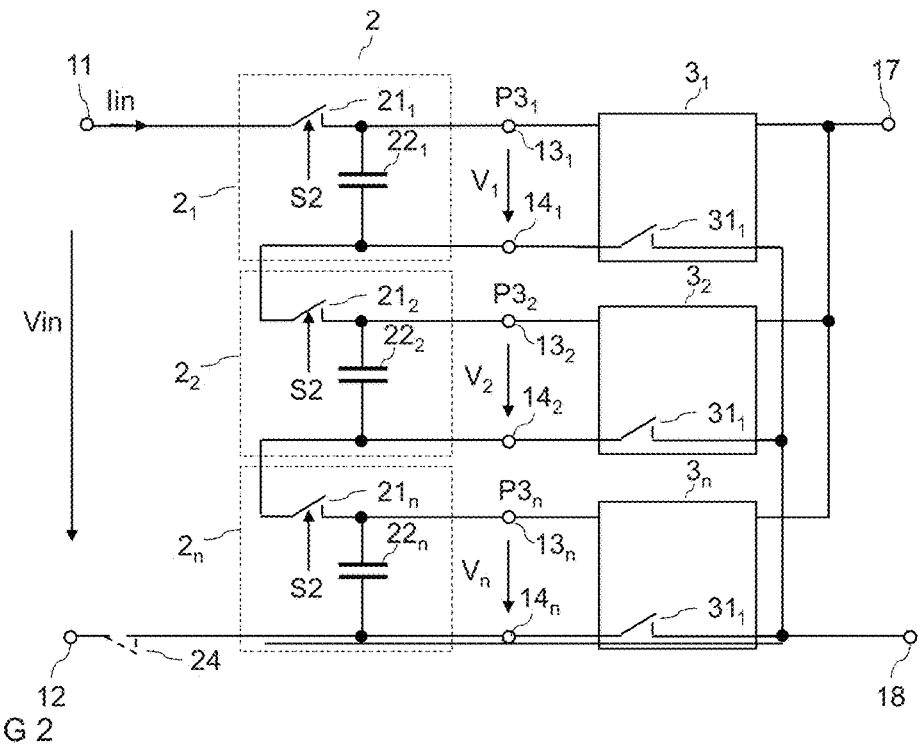
FIG. 2 illustrates one embodiment of a power supply circuit.

FIG. 2 illustrates a first embodiment of the power supply circuit 2. This power supply circuit 2 includes a plurality of power supply cells (supply cells) $2_1$-$2_n$ connected in series between the first and second input nodes 11, 12. Each of these supply cells $2_1$-$2_n$ is configured to output one of the supply voltages $V_1$-$V_n$. Each of the supply cells $2_1$-$2_n$ includes a series circuit with a first switch $21_1$-$21_n$ and a first capacitive storage element (capacitor) $22_1$-$22_n$, wherein the supply voltages $V_1$-$V_n$ are available across the first capacitors $22_1$-$22_n$ of the supply cells $2_1$-$2_n$.

In the supply circuit 2 shown in FIG. 2, as well as in other embodiments of the supply circuit 2 disclosed below, like features of the individual supply cells $2_1$-$2_n$ have like reference characters that are different from each other by subscript indices "1", "2", "n". In the following, if an explanation equivalently applies to each of the supply cells $2_1$-$2_n$ and to their individual components, reference characters without indices will be used. Equivalently, the converter cells $3_1$-$3_n$ and their components have like reference characters that are different from each other by subscript indices "1", "2", "n". In the following, if an explanation equivalently applies to each of the converter cells $3_1$-$3_n$ and to their individual components, reference characters without indices will be used. Each of the individual supply cells $2_1$-$2_n$ outputs one of the supply voltages $V_1$-$V_n$ and, therefore, supplies the converter cell ($3_1$-$3_n$ in FIG. 1) connected thereto.

Referring to FIG. 2, each of the plurality of supply cells 2 is connected to (is associated with) one of the plurality of converter cells 3. Each of the supply cells 2 receives the energy it supplies to the associated converter cell 3 from the input nodes 11, 12. Each of the supply cells 2 can be operated in a charging mode, and in a supply mode. In the charging mode, the supply cell 2 receives energy from the input nodes 11, 12 so that the first capacitor 22 of the supply cell 2 is charged. In the supply mode the supply cell 2 is ready to provide energy to the associated converter cell 3 connected thereto, that is, the supply cell 2 is ready to have the first capacitor 22 discharged. Whether one supply cell 2, in the supply mode, actually provides energy to the associated converter cell 3 is dependent on the operation mode of the converter cell 3. This is explained in further detail below.

In the supply circuit 2 embodiment depicted in FIG. 2, the individual supply cells $2_1$-$2_n$ are operated in the charging mode at the same time. In the charging mode, the control circuit 4 (not illustrated in FIG. 2) switches on the first switches $21_1$-$21_n$ of the individual supply cells $2_1$-$2_n$. When the first switches $21_1$-$21_n$ are switched on, the capacitors $22_1$-$22_n$ of the individuals supply cells $2_1$-$2_n$ are connected in series between the first and second input nodes 11, 12. The individual capacitors $22_1$-$22_n$ are then each charged to a supply voltage $V_1$-$V_n$. The supply voltage $V_1$-$V_n$ of each supply cell is dependent on the input voltage Vin and the capacitances of the respective capacitor $22_1$-$22_n$. According to one embodiment, the capacitances of the individual capacitors $22_1$-$22_n$ are substantially the same. In this case, at the end of the charging phase, the individual capacitors $22_1$-$22_n$ have substantially the same voltage level, that is $$V_1 = V_2 = V_n = \frac{Vin}{n}, \quad (1)$$

where n is the number of supply cells $2_1$-$2_n$ in the supply circuit 2.

Whether the individual first capacitors $22_1$-$22_n$ are completely charged (to the voltage Vin/n in the embodiment explained before) or whether the individual capacitors $22_1$-$22_n$ are only charged partially (to a voltage lower than Vin/n) is dependent on the duration of the charging phase. According to one embodiment, the duration of the charging phase is selected such that the first capacitors $22_1$-$22_n$ are completely charged during the charging phase. At the end of the charging phase, the control circuit 4 opens the first switches $21_1$-$21_n$ and the individual capacitors $22_1$-$22_n$ are ready to be discharged by the individual converter cells $3_1$-$3_n$. In this embodiment, the first switches $21_1$-$24_n$ can be switched on and off simultaneously, so that one control signal S2 received from the control circuit 4 can be used to control the individual first switches $21_1$-$21_n$.

Figure 3:
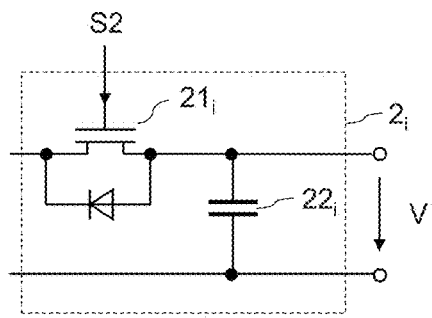
FIG. 3 illustrates one embodiment of a power supply cell implemented with a MOSFET switch.

The first switches $21_1$-$21_n$ can be implemented as conventional electronic switches. According to one embodiment, the first switches $21_1$-$21_n$ are transistors. According to another embodiment the first switches $21_1$-$21_n$ are relays. FIG. 3 illustrates one embodiment of one supply cell 2, that includes a first switch $21_i$ implemented as a transistor. In this specific embodiment, the transistor $21_i$ is a MOSFET. This MOSFET can be implemented as an n-type MOSFET or as a p-type MOSFET and can be implemented as an enhancement (normally-off) transistor or as a depletion (normally-on) transistor, such as a depletion MOSFET or a JFET (Junction Field-Effect Transistor). The transistors can be implemented using a conventional semiconductor material, such as silicon (Si), silicon carbide (SiC), gallium arsenide (GaAs), gallium nitride (GaN), or the like. The MOSFET has a control terminal (gate terminal) for receiving the control signal S2 and a load path (drain-source path) connected in series with the capacitor $22_i$. The control circuit 4 is configured to generate a signal level of the control signal S2 dependent on the specific type of MOSFET such that the MOSFET is switched on when the supply cell $2_i$ is in the charging mode and such that the MOSFET is switched off when the supply cell $2_i$ is in the supply mode. The MOSFET $21_i$ may include an internal body diode which is also illustrated in FIG. 3. The polarity of this body diode may be selected such that the capacitor 22 of the supply cell 2 cannot be charged via the body diode. For this, an anode of the body diode is connected to the capacitor $22_i$ in the embodiment of FIG. 3. Implementing the switch $21_i$ as an n-type MOSFET is only an example. Any other type of electronic switch, such as another type of MOSFET, or another type of transistor, such as a BJT (Bipolar Junction Transistor), a JFET (Junction Field-Effect Transistor), or a GaN-HEMT (Gallium-Nitride High Electron-Mobility Transistor) may be used as well. According to one embodiment, the switches $21_1$-$21_n$ are implemented using Power IC technology supporting lateral power transistors.

Figure 4:
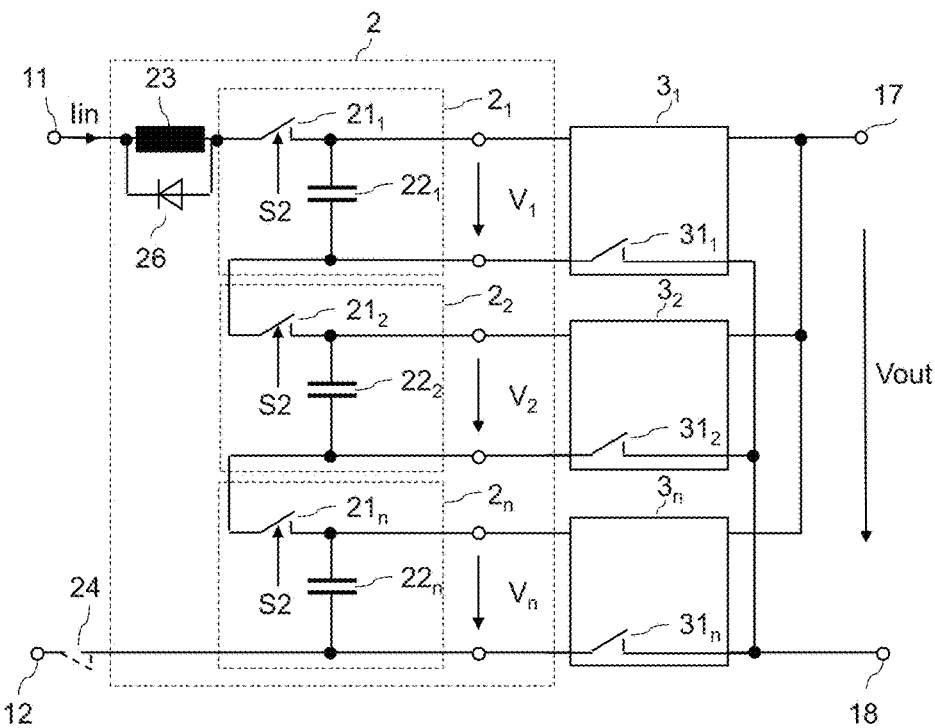
FIG. 4 illustrates another embodiment of the power supply circuit.

FIG. 4 illustrates a further embodiment of the supply circuit 2. In the embodiment of FIG. 4, the supply circuit 2 includes an inductor 23 connected in series with the supply cells $2_1$-$2_n$. In the supply circuit shown in FIG. 2, the input current Iin may have a relatively high current level at the beginning of the charging phase (charging mode). This current level is dependent on how much the individual capacitors $22_1$-$22_n$ have been discharged before. In the supply circuit 2 of FIG. 4, the inductor 23 helps to limit the current level of the input current Iin. Further, the inductor 23 makes it possible to switch on and switch off the switches $21_1$-$21_n$ of the supply cells $2_1$-$2_n$ when a current through the inductor 23 and the switches $21_1$-$21_n$ is substantially zero. Referring to FIG. 4, an optional freewheeling element 26, such as a diode, is connected in parallel with the inductor 23. The freewheeling element 26 takes the current through the inductor 23 when the switches $21_1$-$21_n$ switch off before the inductor 23 has been completely demagnetized. The inductor 23 is not necessarily a discrete device but may be realized by the total stray inductance in the current path that includes the capacitor series circuit between the first input node 11 and the second input node 12.

One way of operation of the supply circuit of FIG. 4 is explained with reference to FIG. 5, in which timing diagrams of the operation mode of the supply circuit 2 and of the input current Iin are illustrated. The operation mode is represented by the control signal S2. For explanation purposes it is assumed that the control signal S2 has a high level (that switches on the individual first switches $21_1$-$21_n$) when the supply circuit 2 is in the charging mode and a low level when the supply circuit is in the supply mode. For explanation purposes it is further assumed that the individual capacitors $22_1$-$22_n$ are not completely charged at the beginning of the charging mode, that is the sum of the individual supply voltages $V_1$-$V_n$ is lower than the input voltage Vin:

$$\sum_{k=1}^{n} V_k < Vin. \quad (2)$$

Figure 5:
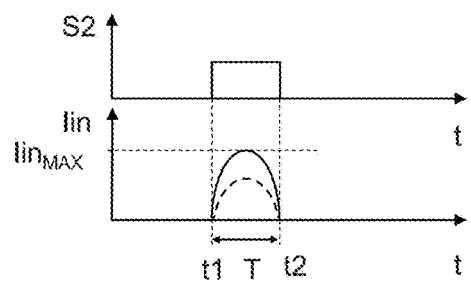
FIG. 5 illustrates one way of operation of the power supply circuit shown in FIG. 4.

In this case, the input current Iin increases at the beginning of the charging mode, wherein the beginning of the charging mode is represented by time t1 in FIG. 5. Referring to FIG. 5, the input current Iin increases to a maximum input current $Iin_{max}$ and then decreases to zero. The maximum input current $Iin_{MAX}$ is dependent on the difference between the voltage level of the input voltage Vin and the voltage level of the voltage across the series circuit with the capacitors $22_1$-$22_n$ at the beginning of the charging phase, wherein the maximum input current $Iin_{MAX}$ increases as the voltage difference increases. A charging period T, which is a time period between the beginning of the charging period at time t1 and a time t2 when the input current Iin decreases to zero, is independent of the voltage difference and is only dependent on the inductance of the inductor 23 and of an overall capacitance of the capacitor series circuit with the plurality of capacitors $22_1$-$22_n$. According to one embodiment, a time period in which the supply circuit 2 is operated in the charging mode corresponds to the charging period T or is even shorter.

In the embodiment shown in FIG. 4, the overall voltage across the capacitor series circuit at the end of the charging period can be higher than the input voltage Vin, that is:

$$\sum_{k=1}^{n} V_k > Vin. \quad (3)$$

Whether the overall voltage is higher than the input voltage Vin is dependent on the point in time when the switches $21_1$-$21_n$ are being turned off. According to one embodiment, the switches $21_1$-$21_n$ turn off when the input current Iin substantially has reached the maximum level (which is between times t1 and t2 in FIG. 5). In this case, the overall voltage corresponds to the input voltage. However, when the switches $21_1$-$21_n$ switch off later, energy that has been (magnetically) stored in the inductor 23, between the first time t1 and the time when the input current Iin reaches the maximum is transferred to the capacitors $22_1$-$22_n$ and causes the overall voltage to increase to above the input voltage Vin. According to one embodiment, in order to prevent the capacitors $22_1$-$22_n$ from being discharged, the switches $221$-$22_n$ are switched off when or before the input current Iin turns zero.

In the charging mode, the supply voltages $V_1$-$V_n$ output by the individual supply cells $2_1$-$2_n$ are referenced to different electrical potentials. The supply voltage $V_n$ of the supply cell $2_n$ directly connected to the second input node 12 is referenced to the electrical potential at the second input node 12. This electrical potential at the second input node 12 will be referred to as first ground potential in the following. The supply cell 2 directly connected to the second input node 12 will be referred to as lowermost supply cell in the following, and the converter cell $3_n$ coupled to the lowermost supply cell 2 will be referred to as lowermost converter cell in the following.

The supply voltage $V_2$ of the supply cell $2_2$ adjacent the lowermost supply cell $2_n$ is referenced to $P12+V_n$ where P12 denotes the first ground potential and $V_n$ denotes the supply voltage of the lowermost supply cell $2_n$. Equivalently, the supply voltage $V_1$ of the supply cell $2_1$ is referenced to $P12+V_n+V_2$. In general, in the charging mode, the supply voltage $V_i$ of one supply cell $2_i$ (wherein $2_i$ denotes an arbitrary one of the supply cells $2_1$-$2_n$) is referenced to $$P12 + \sum_{k=i+1}^{n} V_k. \quad (4)$$

In the supply mode, the supply voltage $V_1$-$V_n$ of each supply cell $2_1$-$2_n$ is referenced to the electrical potential at the second output node 18, which will be referred to as second ground potential in the following. For this purpose, each of the converter cells $3_1$-$3_n$ includes a second switch $31_1$-$31_n$ connected between the capacitor $22_1$-$22_n$ of the corresponding supply cell $2_1$-$2_n$ and the second output node 18. These second switches, which will also be referred to as ground switches in the following, are schematically illustrated in the converter cells $3_1$-$3_n$ of FIGS. 2 and 4. The control circuit 4 controls these second switches $21_1$-$21_n$ to be switched off (to be open) when the corresponding supply cell $2_1$-$2_n$ is in the charging mode. In the lowermost converter cell $3_n$, the second switch $31_n$ is optional and may be omitted.

Besides the charging mode and the supply mode each of the supply cells 2 can be in a standby mode, in which the capacitor 22 has been charged and in which the first switch 21 and the second switch 31 are open. In this operation mode, the supply voltage V provided by the respective supply cell is floating.

Optionally, a further switch 24 is connected between the series circuit with the supply cells $2_1$-$2_n$ and the second input node 12. This further switch 24 is switched on and off simultaneously with the first switches $21_1$-$21_n$. In this embodiment, the lowermost converter cell $3_n$ also includes a second switch $31_n$. In this embodiment, the input voltage Vin and the output voltage Vout can be referenced to different ground potentials. That is, the input voltage Vin can be referenced to the first ground potential, that is, the potential at the second input node 12, and the output voltage Vout can be referenced to the second ground potential, that is, namely the potential at the second output node 18.

According to a further embodiment, the second switch of one of the converter cells $3_1$-$3_n$ that is not the lowermost converter cell $3_n$ is omitted, while the lowermost converter cell $3_n$ includes the second switch $31_n$. If, for example, the second switch $31_2$ of the second converter cell $3_2$ is omitted then the output voltage Vout is referenced to the electrical potential at one of the terminals of the capacitor $22_2$ associated with the second converter cell $3_2$.

Different topologies are possible for implementing the individual converter cells $3_1$-$3_n$. Two possible implementations are explained with reference to FIGS. 6 and 8 below.

Figure 6:
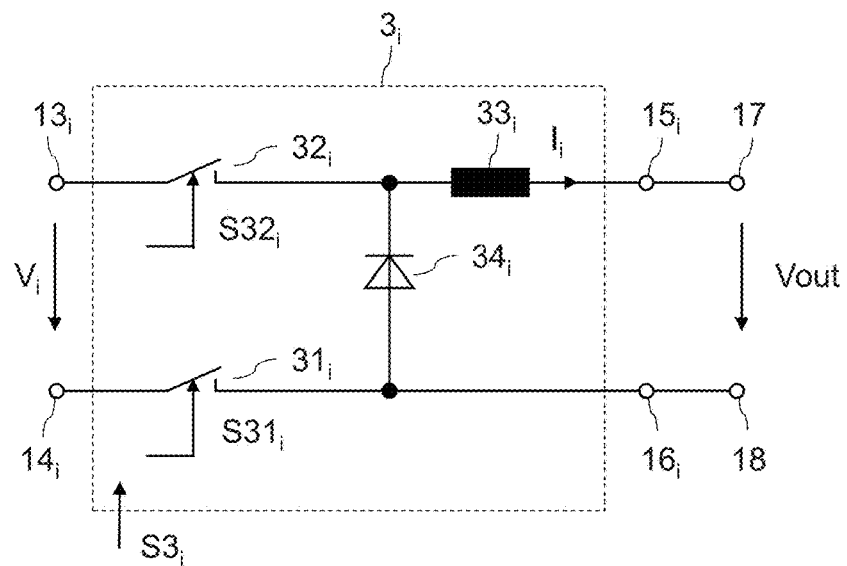
FIG. 6 illustrates in greater detail one embodiment of one of the plurality of converter cells shown in FIG. 1.

FIG. 6 shows one embodiment of a converter cell $3_i$ (wherein $3_i$ represents an arbitrary one of the converter cells $3_1$-$3_n$). This converter cell $3_i$ is implemented with a buck converter topology and includes a series circuit with a third switch $32_i$ and an inductor $33_i$ connected between a first input node $13_i$ and a first output node $15_i$ wherein the first output node $15_i$ is connected to the first output node 17 of the power converter circuit 1. A freewheeling element $34_i$ is connected between a second output node $16_i$ and a circuit node common to the third switch 32 and the inductor $33_i$. The second output node $16_i$ is the output node that is connected to the second output node 18 of the power converter circuit 1. The freewheeling element $34_i$ can be implemented as a conventional freewheeling element, such as a diode or a synchronous rectifier (SR) MOSFET. The third switch $32_i$ will be referred to as control switch in the following.

One way of operation of the converter cell $3_i$ shown FIG. 6 is explained with reference to FIG. 7 that shows timing diagrams of a control signal $S31_i$ controlling the second switch $31_i$, a control signal $S32_i$ controlling the control switch $32_i$ and the output current $I_i$ of the converter cell $3_i$. The control signal $S31_i$ controlling the second switch $31_i$ will be referred to as supply mode control signal in the following, and the control signal $S32_i$ controlling the control switch $32_i$ will be referred to as current control signal, because this control signal helps to control the output current $I_i$. This is explained in greater detail below.

According to one embodiment, the control signal $S32_i$ is a pulse-width modulated (PWM) signal that drives the control switch $32_i$ in a pulse-width modulated (PWM) fashion. That is, there is a plurality of subsequent drive periods, wherein in each drive period the control signal $S32_i$ switches on the control switch $32_i$ for an on-period $T_{ON}$ and switches off the control switch $32_i$ for an off-period $T_{OFF}$. According to one embodiment, the periods $T_{PWM}$ of the individual drive cycles are identical, wherein a duty cycle, which is a ratio between the duration of the on-period $T_{ON}$ and the duration $T_{PWM}$ of the drive cycle, may vary. Just for explanation purposes it is assumed that a high level of the drive signal $S32_i$ of FIG. 7 represents an on-state of the control switch $32_i$, while a low level of the drive signal $S32_i$ represents an off-state of the control switch $32_i$.

Figure 7:
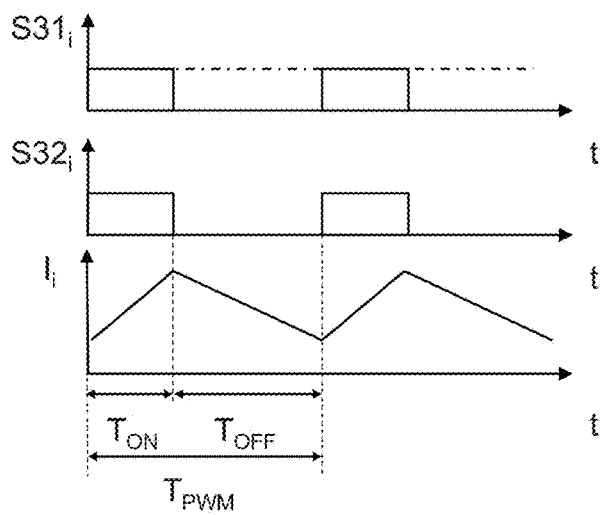
FIG. 7 shows timing diagrams that illustrate one way of operation of the converter cell shown in FIG. 6.

Referring to FIG. 7, the output current $I_i$ increases during the on-period $T_{ON}$ and decreases during the off-period $T_{OFF}$. FIG. 7 shows the timing diagram of the output current $I_i$ in the steady state of the converter cell $3_i$ and in a continuous current mode (CCM). CCM is an operation mode in which the output current $I_i$ does not decrease to zero during the off-period $T_{OFF}$. The average output current $I_i$ can be varied by varying the duty cycle of the control signal $S32_i$. The average output current can be increased by temporarily increasing the duty cycle, and the average output current can be decreased by temporarily decreasing the duty cycle. The control signal $S32_i$ controlling the control switch $32_i$ will also be referred to as current control signal in the following. In the steady state the duty cycle is substantially constant, such as, for example, about 0.25 (if, e.g., n=4 and Vout is about 1V). Operating the converter cell $3_i$ in the CCM is only an example. It is also possible to operate the converter cell $3_i$ in a discontinuous current mode (DCM) in which the output current $I_i$ decreases to zero during the off-period $T_{OFF}$.

During the on-period $T_{ON}$ energy is magnetically stored in the inductor $33_i$. During the off-period, the energy stored in the inductor $33_i$ causes the output current $I_i$ to continue to flow, wherein the freewheeling element $34_i$ provides a freewheeling path that allows the output current $I_i$ to continue to flow.

In the converter cell $3_i$ shown in FIG. 6, the ground switch $31_i$ is connected between the second input node $14_i$ and the freewheeling current path with the rectifier element $34_i$ and the inductor $33_i$ so that the freewheeling current can flow when the second switch $31_i$ has been switched off. Referring to the explanation before, the converter cell $3_i$ is in the supply mode when the second switch $31_i$ is switched on. According to one embodiment (illustrated in solid lines in FIG. 7), the ground switch $31_i$ and the control switch $32_i$ are switched on and off simultaneously by their corresponding control signals $S31_i$, $S32_i$. In this case, the ground switch $31_i$ and the control switch $32_i$ can be controlled by a common control signal $S3_i$ and the supply cells (not shown in FIG. 6) coupled to the converter cell $3_i$ is in the supply mode only when the control switch $32_i$ is switched on. The supply cell may be re-charged between subsequent on-times of the control switch $31_i$.

According to a further embodiment, the ground switch $31_i$ is switched on before the control switch $32_i$ switches on, so that there is a delay time between switching on the ground switch $31_i$ and the control switch $32_i$.

According to a further embodiment, there are two or more drive cycles of the control switch $31_i$ before the associated supply cell is recharged. In this case, the ground switch $31_i$ may be kept in the on-state for several drive cycles. This is illustrated in dashed-and-dotted lines in FIG. 7.

According to yet another embodiment, the ground switch $31_i$ is operated as the control switch and the control switch $32_i$ serves to match the electrical potentials. That is, in this embodiment, the ground switch $31_i$ is driven in a PWM fashion as explained in connection with the control switch $32_i$ herein before, and the control switch $32_i$ can be operated like the ground switch $31_i$ explained herein before. This is beneficial when the freewheeling element 34 and the first switch $31_i$ are implemented as transistors, in particular as MOSFETs. In this case, these transistors can be driven using drive voltages that can be referenced to the same reference potential, namely the potential at the circuit node common to the second switch $31_1$ and the freewheeling element 34 so that these drive voltages can be produced by a common driver.

Figure 8:
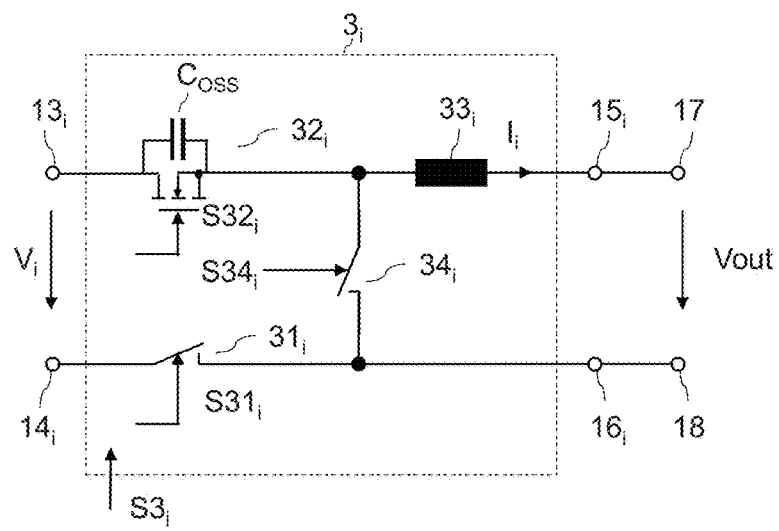
FIG. 8 illustrates in greater detail another embodiment of one of the plurality of converter cells shown in FIG. 1.
Figure 9:
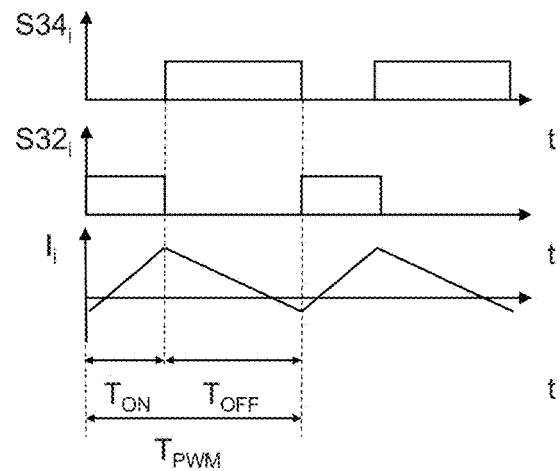
FIG. 9 shows timing diagrams that illustrate one way of operation of the converter cell shown in FIG. 8.

When the diode $34_i$ shown in FIG. 6 is replaced with a switch that acts as a freewheeling element, the converter cell $3_i$ can be operated in a zero-voltage switching (ZVS) mode. The zero-voltage mode is, in particular, useful when the control switch $32_i$ is an electronic switch with an output capacitance that charges when the control switch $32_i$ switches off. FIG. 8 shows one embodiment of the converter cell $3_i$ that includes a switch $34_i$ as the freewheeling element and that includes a MOSFET with an output capacitance $C_{OSS}$ as the control switch $32_i$. One way of operation of this converter cell $3_i$ in the zero-voltage switching mode is explained with reference to FIG. 9 that shows timing diagrams of the output current Iin, the control signal $S32_i$ of the control switch $32_i$ and the control signal $S34_i$ of the freewheeling switch $34_i$.

In the zero-voltage switching mode, the freewheeling switch $34_i$ switches on when the control switch $32_i$ switches off, and the freewheeling switch $34_i$ stays in the on-state until the output current Iin changes the current flow direction (turns negative). This negative current (slightly) magnetizes the inductor $33_i$. The voltage across the output capacitor $C_{OSS}$ of the control switch $32_i$ substantially corresponds to the difference between input voltage $V_i$ and output voltage Vout, when the control switch $32_i$ is in the off-state. When the freewheeling switch $34_i$ switches off, the current induced by the magnetized inductor $33_i$ discharges the output capacitor $C_{OSS}$ of the control switch $32_i$ so that the control switch $32_i$ can be switched on when the voltage across the control switch $32_i$ is substantially zero. This helps to reduce switching losses.

Especially when the converter cell $3_i$ is operated in the DCM or in the ZVS mode, the inductor can be implemented with a lower inductance than in the CCM mode. The switching frequency of the switch driven in the PWM fashion (that is the control switch $32_i$ or the first switch $31_i$) is, for example, several MHz, such as 10 MHz, or even more.

Figure 10:
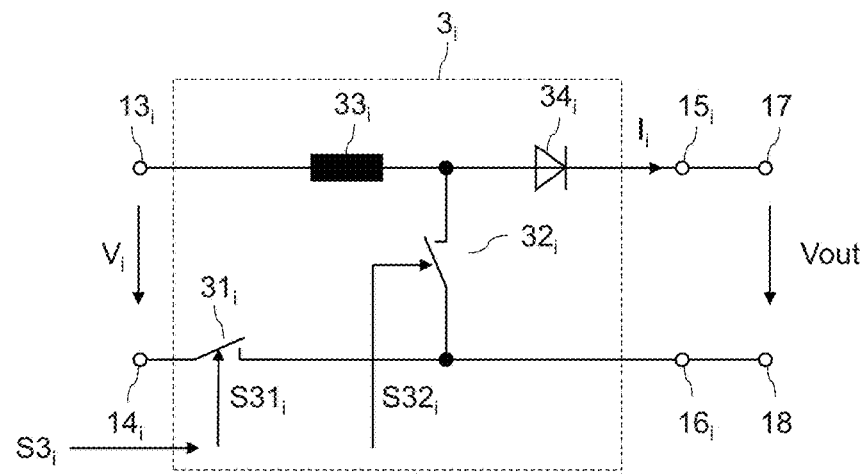
FIG. 10 illustrates in greater detail another embodiment of one of the plurality of converter cells shown in FIG. 1.

In the converter cell $3_i$ shown in FIG. 6, a maximum voltage level of the output voltage Vout is lower than a voltage level of the supply voltage $V_i$. FIG. 10 shows an embodiment of a converter cell $3_i$ that can generate an output voltage Vout with a higher voltage level than the supply voltage $V_i$. This converter cell $3_i$ has a boost converter topology. In this embodiment, a series circuit with an inductor $33_i$ and a control switch $32_i$ is connected between the input nodes $13_i$, $14_i$. Further, a rectifier element $34_i$ is connected between a circuit node common to the inductor $33_i$ and the control switch $32_i$ and the first output node $15_i$. Like in the embodiment of FIG. 6, the control switch $32_i$ is driven in a PWM fashion, wherein each time the switch $32_i$ is switched on, energy is magnetically stored in the inductor $33_i$. The energy stored in the inductor $33_i$ is at least partially transferred to the output nodes $15_i$, $16_i$, when the control switch $32_i$ is switched off. The control switch $32_i$ and the second switch $31_i$ can be switched on an off simultaneously. When the second switch $31_i$ has been switched off, the further rectifier element $35_i$ allows the output current $I_i$ to flow.

Figure 11:
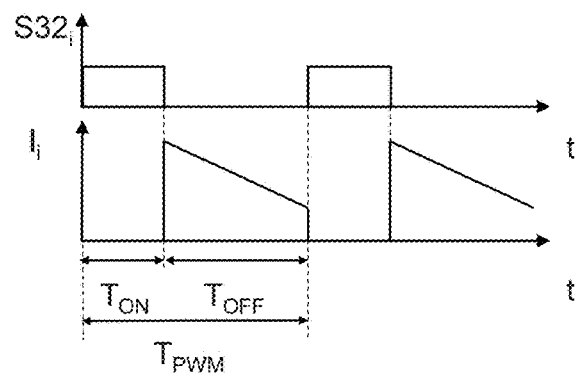
FIG. 11 shows timing diagrams that illustrate one way of operation of the converter cell shown in FIG. 8.

Timing diagrams of the control signal $S32_i$ of the control switch $32_i$ and the output current $I_i$ are illustrated in FIG. 11. In this embodiment, the output current $I_i$ only flows during the off-period. Like in the embodiment of FIG. 6, an average of the output current $I_i$ can be controlled by adjusting the duty cycle of the control signal $S32_i$.

Each of the converter cells $3_i$ explained before can be operated in a continuous current mode (CCM), a discontinuous current mode (DCM), or in the ZVS mode. Furthermore, the converter cell $3_i$ can be implemented with a topology other than a buck converter topology (as shown in FIGS. 6 and 8) and a boost converter topology (as shown in FIG. 10) as well. Examples of those other converter cell topologies include a buck-boost converter topology, or a boost-buck converter topology, to name only two.

Figure 12:
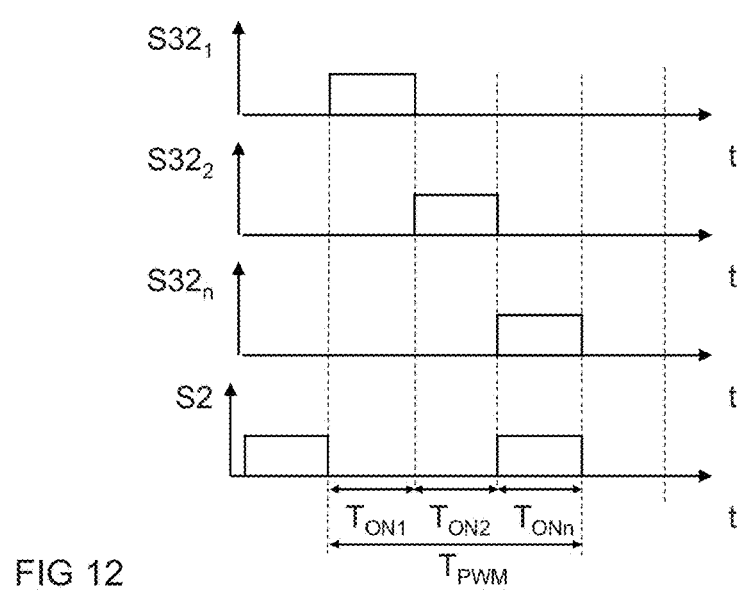
FIG. 12 shows timing diagrams that illustrate one way of operation of a power converter circuit including a supply circuit as shown in one of FIGS. 2 and 4.

FIG. 12 shows timing diagrams illustrating one way of operation of a power converter circuit 1 of the type shown in FIG. 1 when implemented with a supply circuit 2 as shown in one of FIGS. 2 and 4 and with a plurality of converter cells $3_i$-$3_n$ as shown in one of FIGS. 6 and 8. FIG. 12 shows timing diagrams of the control signals $S32_1$-$S32_n$ of the control switch $32_i$ of each converter cell $3_1$-$3_n$. The ground switch $31_i$ can be controlled as explained before, that is, the ground switch $31_i$ and the control switch $32_i$ of each one converter cell $3_i$ can be controlled simultaneously, or the ground switch $31_i$ can already be in the on-state before the control switch switches on. FIG. 12 shows timing diagrams of PWM control signals $S3_1$, $S3_2$, $S3_n$, wherein each of these control signals controls the control switch ($32_i$ in FIGS. 6 and 8) and the second switch ($31_i$ in FIGS. 6 and 8) of one of the converter cells $3_1$-$3_n$. FIG. 12 further shows a timing diagram of the supply circuit control signal S2 that controls the charging mode of the individual supply cell $2_1$-$2_n$. In this embodiment, the individual supply cells $2_1$-$2_n$ are operated in the charging mode simultaneously.

Referring to FIG. 12, each of the control signals $S3_1$-$S3_n$ can have one of an on-level and an off-level. For the purpose of explanation it is assumed that a high-level of a control signal $S3_1$-$S3_n$ received by a converter cell $3_1$-$3_n$ corresponds to the on-level and switches on the control switch ($32_i$ in FIGS. 6 and 8) and the ground switch $31_1$-$31_n$ of the converter cell $3_1$-$3_n$, while a low-level corresponds to the off-level and switches off the control switch and the ground switch. Equivalently, a high level of the supply circuit control signal S2 represents a charging mode of the supply cells $2_1$-$2_n$.

In the operation scenario illustrated in FIG. 12, the control circuit 4 operates the individual converter cells $3_1$-$3_n$ such that the control switch of only one converter cell $3_1$-$3_n$ is switched on at one time. That is, on-periods $T_{ON1}$, $T_{ON2}$, $T_{ONn}$ of the control switches in the individual converter cell $3_1$-$3_n$ do not timely overlap. Referring to explanation above, the individual converter cells $3_1$-$3_n$ can be operated in one of the DCM mode, ZVS mode, and the CCM mode, wherein the ZVS mode exhibits the lowest switching losses. In FIG. 12, the control signal $S3_n$ is the control signal of lowermost converter cell $3_n$ coupled to the lowermost supply cell $2_n$. When the input voltage Vin and the output voltage Vout are referenced to the same ground potential, that is, when the first ground potential and the second ground potential explained above are identical, the lowermost supply cell $2_n$ can be operated in the charging mode and in the supply mode at the same time. That is, the control switch of the lowermost converter cell $3_n$ can be switched on to receive power from the lowermost supply cell $2_n$ while the capacitor $22_n$ is coupled to the input 11, 12. Thus, in the embodiment shown in FIG. 12, the on-period $T_{ONn}$ of the control switch of the lowermost converter cell $3_n$ and the charging mode period of the lowermost supply cell $2_n$ may overlap. A "charging mode period" of a supply cell is a time period when the supply cell is in the charging mode.

Figure 13:
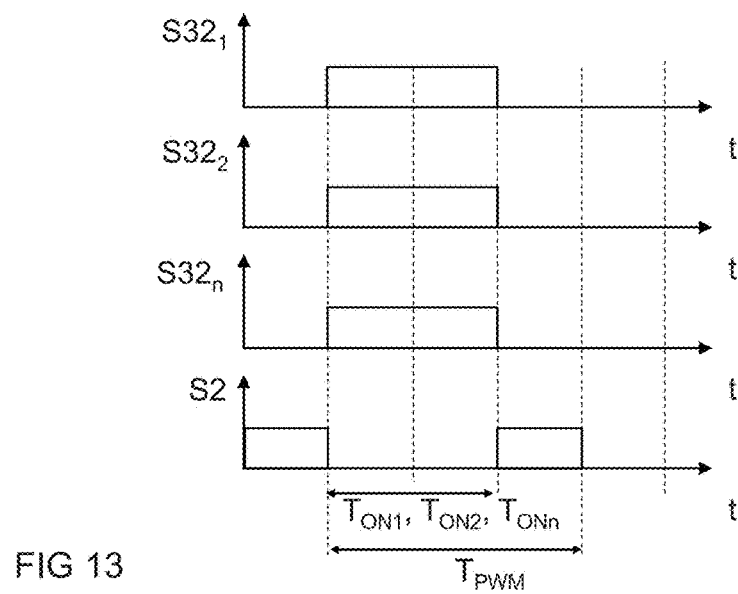
FIG. 13 shows timing diagrams that illustrate another way of operation of a power converter circuit including a supply circuit as shown in one of FIGS. 2 and 4.

FIG. 13 illustrates a further embodiment for operating the power converter circuit 1. In this embodiment, the control switches in the individual converter cell $3_1$-$3_n$ are switched on and off substantially simultaneously so that there is a common on-period. In this embodiment, the charging mode period and the on-period $T_{ONn}$ of the lowermost converter cell $3_n$ do not overlap. The supply circuit 2 is operated in the charging mode after the common on-period $T_{ON1}$, $T_{ON2}$, $T_{ONn}$. This mode enables to increase the output current extremely rapidly. For example, this operation mode is used to re-adjust the output voltage Vout after rapid changes of the load.

Figure 14:
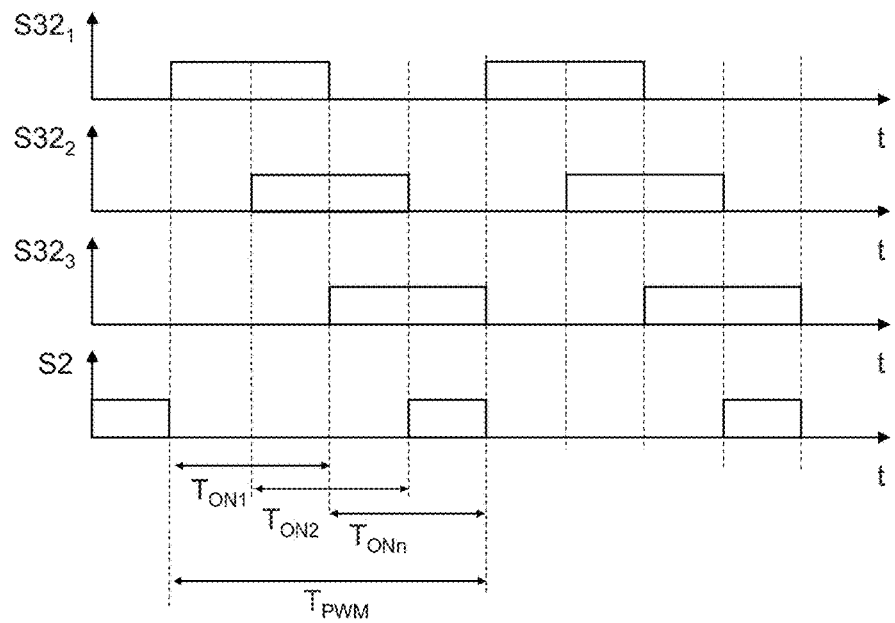
FIG. 14 shows timing diagrams that illustrate another way of operation of a power converter circuit including a supply circuit as shown in one of FIGS. 2 and 4.

According to a further embodiment illustrated in FIG. 14, the individual converter cells are operated in a interleaved fashion such that the on-periods $T_{ON1}$, $T_{ON2}$, $T_{ONn}$ of the control switches (and the second switches) in the individual converter cells $3_1$-$3_n$ overlap. In case the input voltage Vin and the output voltage Vout are referenced to the same ground potential, the charging mode period and the on-period $T_{ONn}$ of the control switch in the lowermost converter cell $3_n$ may overlap. However, the charging mode period may only overlap a part of the on-period $T_{ONn}$ in which none of the other control switches is switched on. That is, the charging mode period should not overlap one of the other on-periods $T_{ON1}$, $T_{ON2}$.

Although FIGS. 12 to 14 illustrates one way of operation of a power converter circuit with n=3 converter cell the operation explained with reference to these FIGS. 12 to 14 is not restricted to power converter circuits with n=3 converter cells, but applies to power converter circuits with only two (n=2) or with more than three (n>3) converter cells equivalently.

In each of the embodiments explained with reference to FIGS. 12 to 14, the control circuit 4 may control the output currents of the individual converter cells $3_1$-$3_n$ such that the (average) level of the output voltage Vout equals a predefined reference voltage, or may control the output currents of the individual converter cells $3_1$-$3_n$ such that the (average) level of the output current Iout equals a predefined reference current. In an operation mode in which the converter cells $3_1$-$3_n$ control the output current Iout the optional output capacitor (illustrated in dashed lines in FIG. 1) can be omitted.

The control circuit 4 may control the individual converter cells $3_1$-$3_n$ such that the control signals $S32_1$-$S32_n$ have the same duty cycle in one drive cycle $T_{PWM}$. According to a further embodiment, the control circuit 4 controls one of the converter cells, such as converter cell $3_1$, as a master converter cell such that a duty cycle of the corresponding control signal $S3_1$ is dependent on the output voltage Vout (or dependent on the output current Iout), and controls the other converter cells, such as converter cells $3_2$-$3_n$, as slave converter cells such that output currents $I_2$-$I_n$ of these other converter cells substantially equals to the output current $I_1$ of the master converter cell $3_1$. The output currents of the slave converter cells can be controlled by adjusting the duty cycle of the control signals $S31_1$-$S32_n$. In this embodiment, output currents $I_1$-$I_n$ of the individual converter cells $3_1$-$3_n$ are substantially balanced. The converter cell $3_1$ acts as a master converter cell and the other converter cells $3_2$-$3_n$ act as slave converter cells in this embodiment.

According to another embodiment, the individual converter cells $3_1$-$3_n$ are controlled independently of each other such that each converter cell $3_1$-$3_n$ supplies a predefined output current the output 17, 18, wherein the output currents $I_1$-$I_n$ of the individual converter cells $3_1$-$3_n$ can be mutually different. According to yet another embodiment, the individual controller cells $3_1$-$3_n$ are controlled independently of each other to generate a same predefined output voltage level at the output 17, 18.

Figure 15:
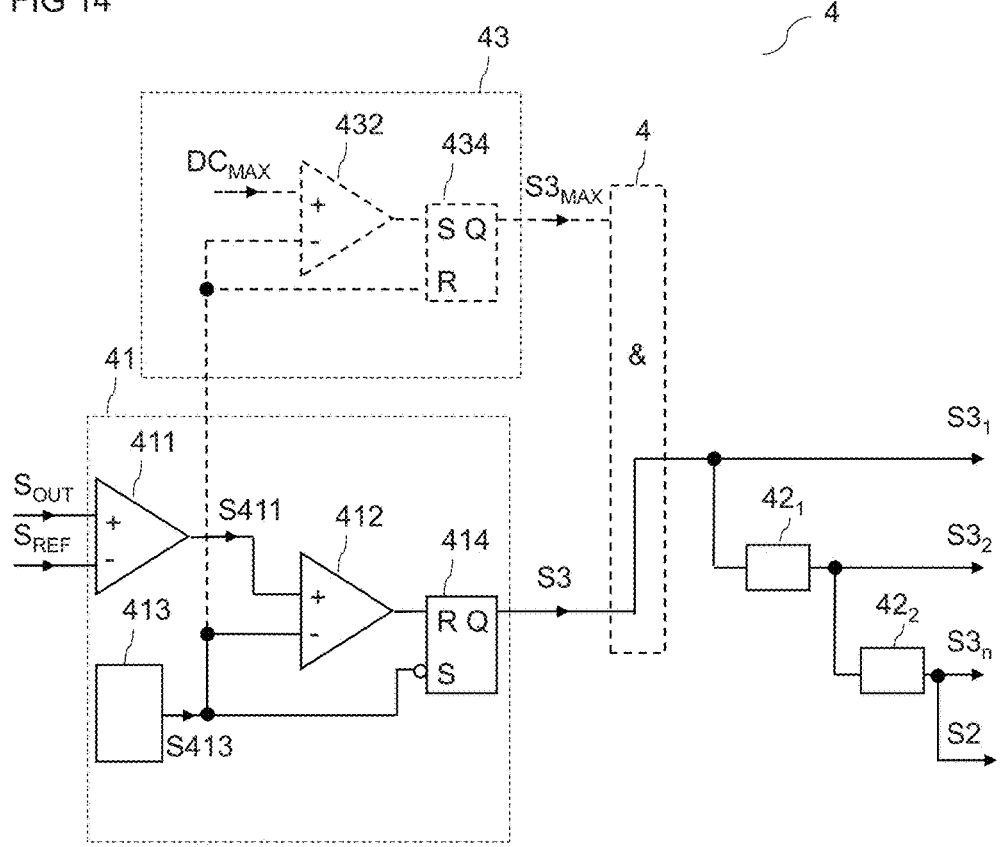
FIG. 15 illustrates one embodiment of a control circuit.

FIG. 15 illustrates one embodiment of the control circuit 4 configured to operate the power converter circuit 1 in accordance with the operation scenario illustrated in FIG. 12 and such that the individual control signals $S3_1$-$S3_n$ have the same duty cycle. Referring to FIG. 15, the control circuit 4 includes a PWM generator 41 configured to receive a reference signal $S_{REF}$ and an output signal $S_{OUT}$ representing one of the output voltage Vout and the output current Iout. The PWM generator 41 is configured to output a PWM signal S3 dependent on the output signal $S_{OUT}$ and the reference signal $S_{REF}$. In the embodiment of FIG. 15, the PWM generator 41 includes a controller 411 that is configured to output a regulation signal S411 dependent on a relationship between the output signal $S_{OUT}$ and the reference signal $S_{REF}$. A comparator 412 receives the regulation signal S411 and a sawtooth signal S413 from a sawtooth generator 413. A flip-flop 414 is set each time a falling edge of the sawtooth signal S413 occurs and is reset each time the sawtooth signal reaches the regulation signal S411. The PWM signal S3 is available at the output of the flip flop 414. The PWM signal S32 generated by the PWM generator 41 is used as the control signal $S3_1$ in the converter cell $3_1$. Further, time delayed versions of this PWM signal S3 are generated using a first and a second delay element $42_1$, $42_2$, wherein the first delay element $42_1$ delays the first control signal $S3_1$ and outputs the control signal $S3_2$ for the converter cell $3_2$, and the second delay element $42_2$ delays the second control signal $S32_2$ and outputs the control signal $S3_n$ to the lowermost converter cell $3_n$. The supply circuit control signal S2 corresponds to the control signal $S3_n$ of the lowermost converter cell $3_n$ in this embodiment.

Figure 16:
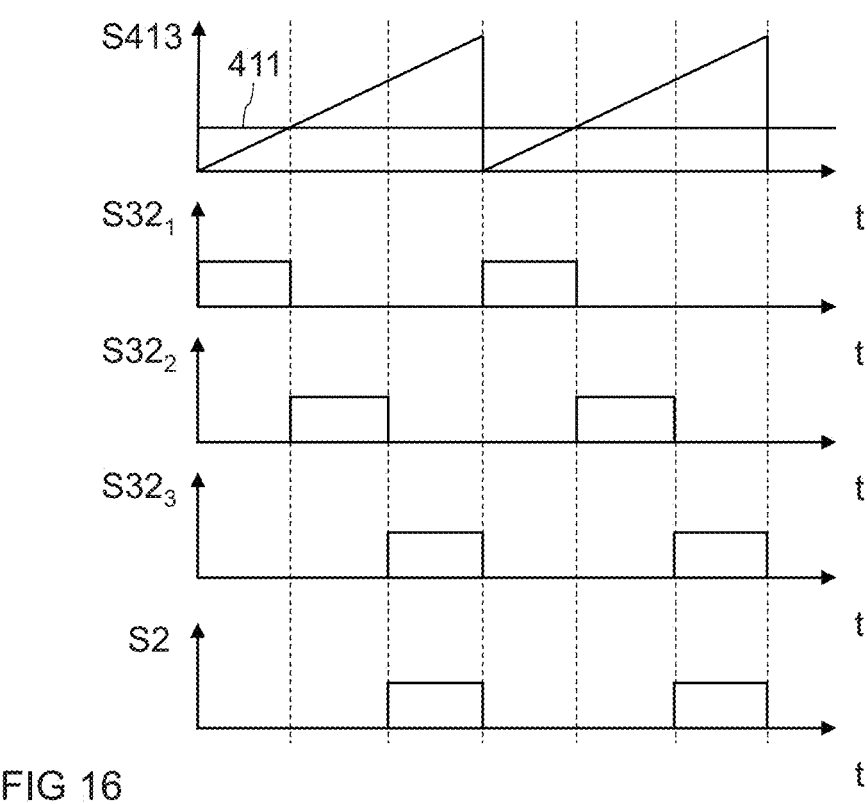
FIG. 16 shows timing diagrams that illustrate one way of operation of the control circuit shown in FIG. 15.

One way of operation of the control circuit 4 shown in FIG. 15 is illustrated in FIG. 16, in which timing diagrams of the sawtooth signal S413, the regulation signal S411 and of the control signals $S3_1$-$S3_n$ are illustrated. The period of one drive cycle of one converter cell is defined by the frequency of the sawtooth signal, wherein $T_{PWM}=1/f_{SW}$, wherein $f_{SW}$ is the frequency of the sawtooth signal. The delay time introduced by each of the delay elements $42_1$, $42_2$ is $T_{PWM}/3$ in a power converter circuit with n=3 converter cells. In general, n−1 delay elements are required to generate n control signals for n different converter cells, wherein the delay time introduced by each of the delay elements is $T_{PWM}/n$. The duty cycles of the individual control signals are identical and are dependent on a relationship between the output signal $S_{OUT}$ and the reference signal $S_{REF}$. The controller 411 provides the regulation signal S411. The controller can be a conventional P-controller, I-controller, PI-controller, or PID-controller.

Optionally, the duty cycle of the control signals $S3_1$-$S3_n$ is limited to a predefined maximum duty cycle $S_{MAX}$. Such limitation may be performed by a duty cycle limiting circuit 43 that includes a comparator 432 corresponding to the comparator 412 of the PWM generator, and a flip flop 434 corresponding to the flip flop 414 of the PWM generator 41. The comparator 432 of the limiting circuit 43 receives a maximum duty cycle signal $DC_{MAX}$ instead of the regulation signal. A PWM signal $S3_{MAX}$ output by the limiting circuit 43 represents a PWM signal with a maximum duty cycle. An optional logic gate 44 receives the maximum PWM signal $S3_{MAX}$ and the PWM signal S3 output by the PWM generator 32. The first control signal $S32_1$ in this embodiment is either the PWM signal S3 output by the PWM generator 41 or is the maximum PWM signal S43, whichever has the lower duty cycle. According to one embodiment, the logic gate 44 is an AND gate.

Figure 17:
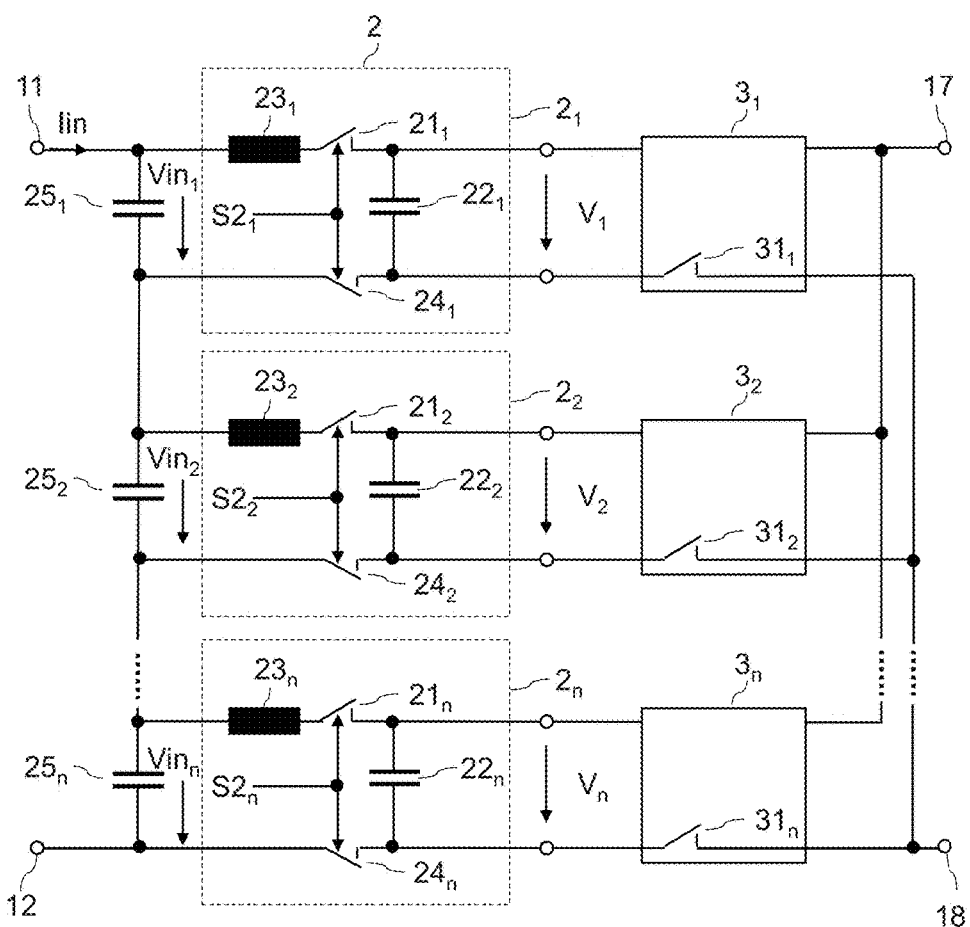
FIG. 17 illustrates another embodiment of a power converter circuit including a supply circuit.

In the supply circuit shown in FIG. 2 the individual supply cells $2_1$-$2_n$ are operated in the charging mode simultaneously. FIG. 17 illustrates an embodiment of a supply circuit 2 in which the individual supply cells $2_1$-$2_n$ can be operated in the charging mode independently. In this embodiment, the supply circuit 2 includes a plurality of second capacitive storage elements (capacitors) $25_1$-$25_n$ connected in series between the input nodes 11, 12. Each of these second capacitors $25_1$-$25_n$ is connected in parallel with one of the supply cells $2_1$-$2_n$, wherein the individual supply cells $2_1$-$2_n$ are connected in series between the input nodes 11, 12. Like in the embodiment shown in FIG. 2, each of the supply cells $2_1$-$2_n$ includes a capacitor $22_1$-$22_n$ and a first switch $21_1$-$21_n$ connected in series with the capacitor $22_1$-$22_n$. Further, each supply cell $2_1$-$2_n$, includes an inductor $23_1$-$23_n$ connected in series with the capacitor $22_1$-$22_n$ and the first switch $21_1$-$21_n$. Further, except for the lowermost supply cell $2_n$, each supply cell $2_1$-$2_n$ includes a further switch $24_1$-$24_n$ connected in series with the capacitor $22_1$-$22_n$, the first switch $21_1$-$21_n$ and the inductor $23_1$-$23_n$. The series circuit with the capacitor, the first switch, the inductor and the further switch of one supply cell $2_1$-$2_n$ is connected in parallel with the second capacitor $25_1$-$25_n$ coupled to the corresponding supply cell $2_1$-$2_n$.

The further switch $24_n$ of the lowermost supply cell $2_n$ is optional. In each of the supply cells $2_1$-$2_n$ that include a first switch $21_1$-$21_n$ and a further switch $24_1$-$24_n$, the capacitor $22_1$-$22_n$ is connected between these switches. The supply voltage $V_1$-$V_n$ provided by the individual supply cells $2_1$-$2_n$ is the voltage across the capacitor $22_1$-$22_n$ of the respective supply cell $2_1$-$2_n$.

In the supply circuit 2 shown FIG. 17 each of the second capacitors $25_1$-$25_n$ supplies an input voltage $Vin_1$-$Vin_n$ to one supply cell $2_1$-$2_n$. The voltage levels of the individual input voltages $Vin_1$-$Vin_n$ is dependent on the overall input voltage Vin between the input nodes 11, 12 and is dependent on the capacitances of the individual second capacitors $25_1$-$25_n$. According to one embodiment, the capacitances of the individual second capacitors $25_1$-$25_n$ are substantially equal. In this case, the individual input voltages $Vin_1$-$Vin_n$ are equal and correspond to Vin/n. The inductors $23_1$-$23_n$ in the individual supply cells $2_1$-$2_n$ are optional Like in the embodiment explained with reference to FIG. 4, these inductors help to prevent high inrush currents into the first capacitors $22_1$-$22_n$ of the individual supply cells $2_1$-$2_n$. It is also possible, to implement some of the supply cells $2_1$-$2_n$ with an inductor and to implement others of the supply cells $2_1$-$2_n$, without the inductor.

The individual supply cells $2_1$-$2_n$ may be operated in the same way. One way of operation of one supply cells 2 (wherein reference character 2 denotes one of the supply cells $2_1$-$2_n$) is explained in the following. The supply cell 2 is operated in the charging mode when the first switch 21 and the second switch 24 are switched on. In this case, the first capacitor 22 is connected in parallel with the second capacitor 25, so that the second capacitor 22 is charged to the supply voltage provided by the second capacitor 25 (or, by virtue of the inductors $23_1$-$23_n$, to a voltage higher than this supply voltage). At the end of the charging mode the first switch 21 and the further switch 24 are switched off. After the charging phase the first capacitor 22 can be operated in the supply mode. For this purpose, the second capacitor 22 is coupled to the second output node 18 via the second switch 31 of the converter cell 3 coupled to the supply cell 2.

The further switches $24_1$-$24_n$ of the supply cells $2_1$-$2_n$ protect the second capacitors $25_1$-$25_n$ from being discharged when the supply cells $2_1$-$2_n$ are operated in the supply mode. The lowermost supply cell $2_n$ can be operated in the charging mode and in the supply mode at the same time if the second input node 12 and the second output node 18 are referenced to the same ground potential. In case the second input node 12 and the second output node 18 are referenced to different ground potentials, the lowermost supply cell $2_1$ includes the further switch $24_n$, and the converter cell 3 coupled to the lowermost supply cell 2 includes the ground switch $31_n$.

Figure 18:
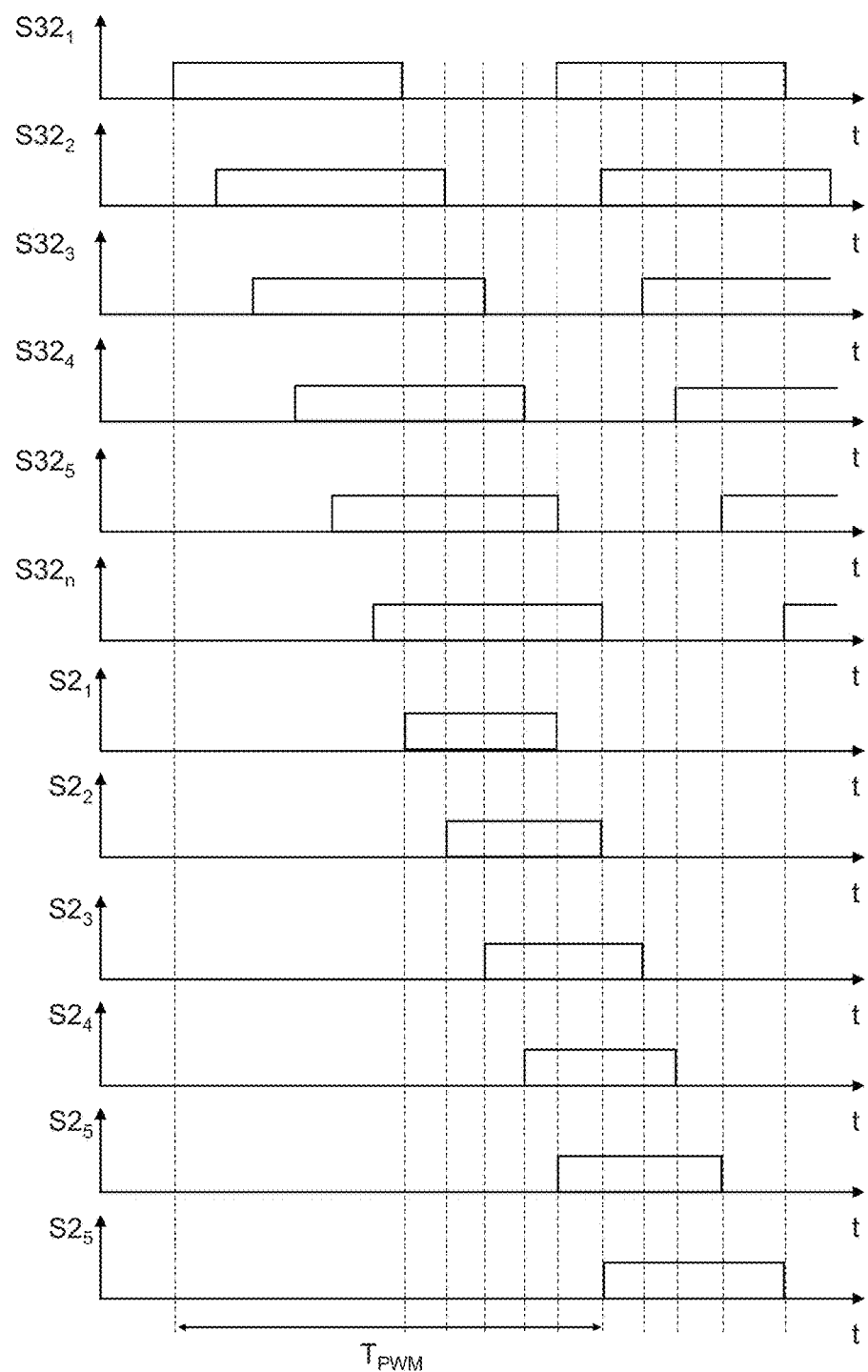
FIG. 18 shows timing diagrams that illustrate one way of operation of the power converter circuit shown in FIG. 17.

One way of operation of a power converter circuit including a supply circuit 2 of the type shown in FIG. 17 is explained with reference to FIG. 18 below. For purposes of explanation it is assumed that the supply circuit 2 includes n=6 supply cells, wherein each of these supply cells supplies one of n=6 converter cells. FIG. 18 shows timing diagrams of control signals $S32_1$-$S32_n$ wherein each of these control signals controls the control switch in one of the converter cell. Further, timing diagrams of supply circuit control signals $S2_1$-$S2_n$ are illustrated. Each of these supply circuit control signals $S2_1$-$S2_n$ controls the operation of one of the supply cells $2_1$-$2_n$, wherein supply circuit control signal $S2_1$ controls the operation of the supply cells $2_1$ coupled to converter cell $3_1$ that receives control signal $S3_1$, supply circuit control signal $S2_2$ controls the operation of the supply cell $2_2$ coupled to converter cell $3_2$ that receives control signal $S3_2$, and so on.

In the embodiment shown in FIG. 18, a high level of one supply circuit control signal $S2_1$-$S2_n$ represents a charging mode of the corresponding supply cell $2_1$-$2_n$, and a high level of a converter control signal $S3_1$-$S3_n$ represents a time period in which a converter cell $3_1$-$3_n$ receives energy from the corresponding supply cell $2_1$-$2_n$. That is, a high level of one converter control signal $S3_1$-$S3_n$ represents the supply mode of the corresponding supply cell $2_1$-$2_n$.

In the embodiment shown in FIG. 18, the individual converter cells are operated in an interleaved fashion wherein each supply cell is recharged after the control switch of the associated converter cell has been switched off. That is, a supply circuit control signal $S2_1$-$S2_n$, changes to a signal level (a high level in the present embodiment) that operates the corresponding supply cell $2_1$-$2_n$ in the charging mode after the control signal $S32_1$-$S32_n$ of the converter cell $3_1$-$3_n$ coupled to the supply cell changes to an off-level. The duration of the charging cycle is at most the duration in which the control switch $32_i$ of the corresponding converter cell $3_i$ is in the off-state.

Figure 19:
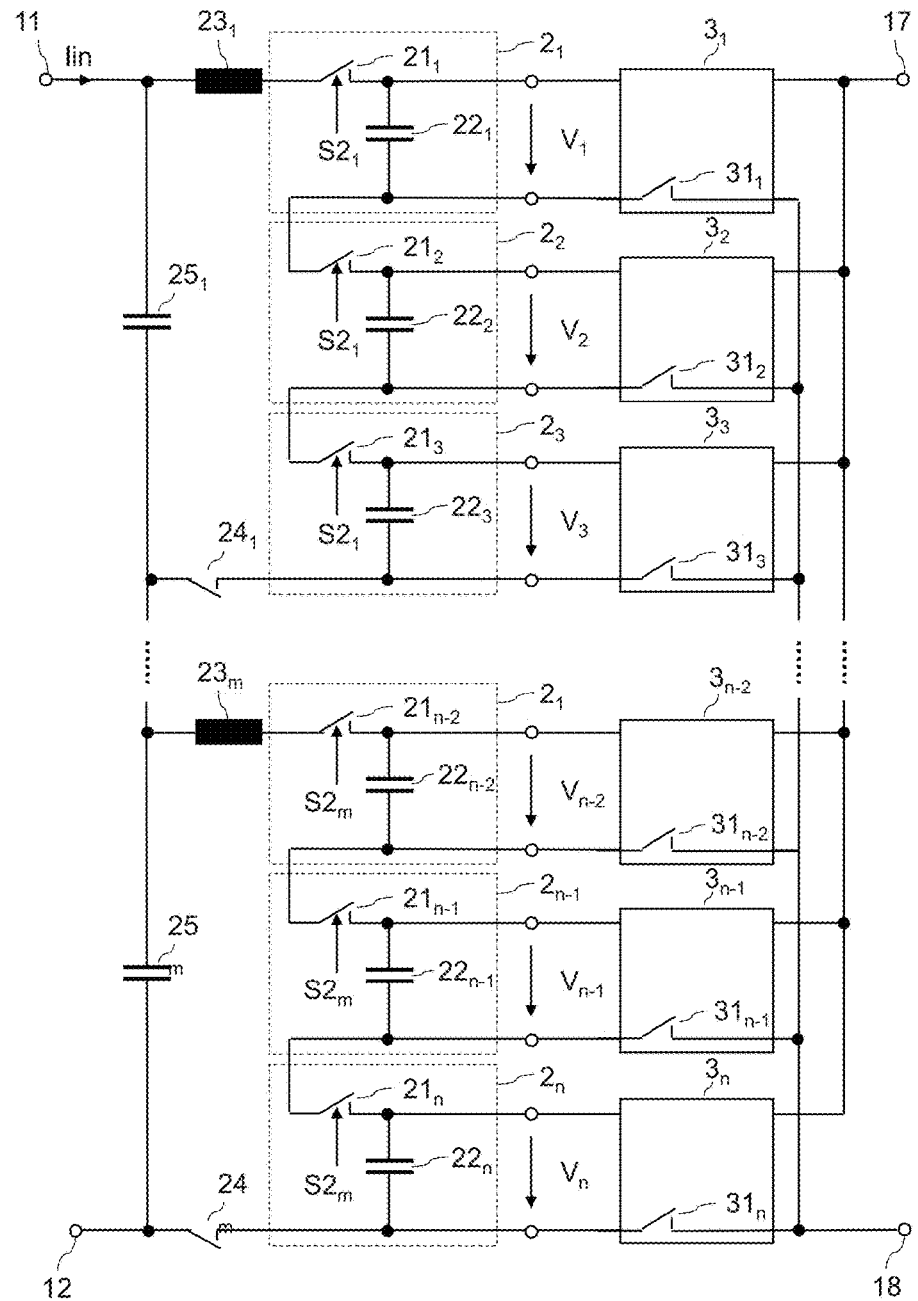
FIG. 19 illustrates a further embodiment of a power converter circuit including a supply circuit.

FIG. 19 illustrates a further embodiment of a power converter circuit. This power converter circuit is a combination of the power converter circuits explained with reference to FIGS. 2 and 17. In the embodiment of FIG. 19, m second capacitors $25_1$, $25_m$ are connected between the input nodes 11, 12, wherein each of these second capacitors $25_1$, $25_m$ is connected in parallel with a series circuit including some the pluralities of supply cells $2_1$-$2_n$. In the embodiment of FIG. 19 there are two second capacitors $25_1$-$25_m$ connected between the input nodes 11, 12, and a series circuit with three supply cells is connected in parallel with each second capacitor $25_1$, $25_m$. Each of the supply cells includes a first capacitor $25_1$-$25_n$ and a first switch $21_1$, $21_n$. Optionally, an inductor $23_1$, $23_n$ is connected in series with each of the supply cell series circuits. Each of the supply cell series circuits connected in parallel with one second capacitor $25_1$, $25_m$ has a lowermost supply cell, which is supply cell $2_3$ in the series circuit connected in parallel with the second capacitor $25_1$, and which is supply cell $2_n$ in the series circuit connected in parallel with the second capacitor $25_m$. Supply cell $2_n$ is the lowermost supply cell of the overall series circuit. A further switch $24_1$, $24_m$ is connected between the lowermost supply cell $2_3$, $2_n$ of each series circuit connected in parallel with one second capacitor $25_1$-$25_m$, wherein the further switch $24_m$ connected to the lowermost supply cell $2_n$ of the overall supply cell series circuit $2_1$-$2_n$ is optional.

Figure 20:
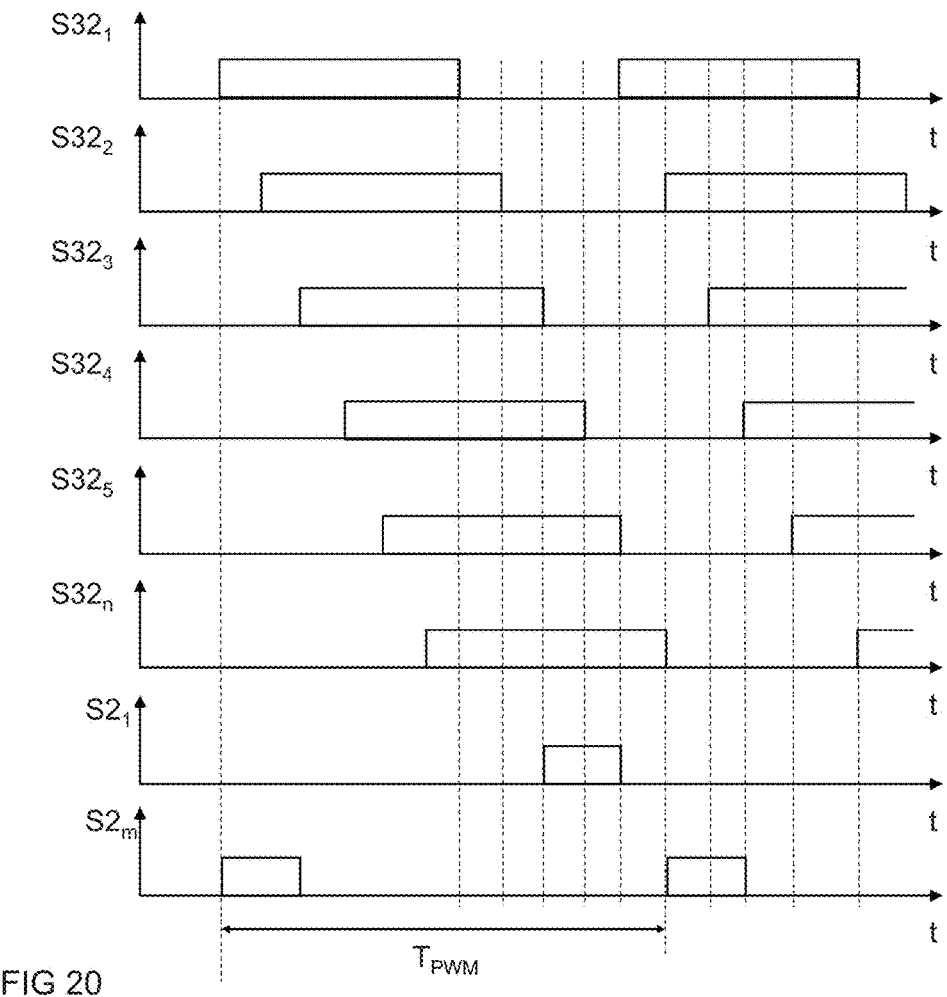
FIG. 20 shows timing diagrams that illustrate one way of operation of the power converter circuit shown in FIG. 19.

In the supply circuit 2 shown in FIG. 19, the supply cells coupled to one second capacitor $25_1$, $25_m$ are operated in the charging mode simultaneously and can be operated in the supply mode independently. FIG. 20 shows timing diagrams that illustrate one way of operation of the power converter circuit shown in FIG. 19. In FIG. 20, $S2_1$ denotes the supply circuit control signal that controls the charging mode of the supply cell $2_1$-$2_3$ of the first series circuit, and $S2_m$ denotes the supply circuit control signal that controls the charging mode of the supply cell $2_3$-$2_n$ of the first series circuit, and $S2_m$ denotes the supply circuit control signal that controls the charging mode of the supply cells $2_3$-$2_n$ of the second series circuit. $S3_1$-$S3_n$ denotes the converter control signal of the individual converter cells connected to the supply cells. Referring to FIG. 20, the individual converter cells may be operated in an interleaved fashion. A duty cycle is substantially D=0.5 in the present embodiment. The supply cells $2_1$-$2_n$ of the first series circuit are re-charged after an activation sequence in which each of the converter cells $3_1$-$3_n$ coupled to the supply cells $2_1$-$2_3$ of the first series circuit have been activated, and the supply cells $2_4$-$2_n$ of the second series circuit are re-charged after an activation sequence in which each of the converter cells $3_4$-$3_n$ connected to the supply cells $2_4$-$2_n$ of the second series circuit have been activated.

According to one embodiment, the power converter circuit 1 includes m=2 second capacitors $25_1$-$25_m$ and a series circuit with three supply cells connected in parallel with each of these m=2 second capacitor $25_1$-$25_m$. This results in an overall number of 6 (=m×3) supply cells. However, this is only an example. The number of second capacitors $25_1$-$25_m$ is not restricted to m=2. More than m=2 second capacitors $25_1$-$25_m$ can be used as well, and a series circuit with two or more supply cells may be connected in parallel with each second capacitor $25_1$-$25_m$.

In the embodiments explained before, each of the supply cells $3_i$ is operated in the supply mode at least once between two subsequent charging cycles. However, this is only an example. It is also possible, e.g. when a power consumption of the load Z is very low (light load operation) to deactivate one or more converter cells between two charging cycles. To "deactivate" means that the corresponding converter cell $3_i$ is not operated in the supply mode in the time between two subsequent charging cycles, although the corresponding capacitor $22_i$ has been charged. The at least one converter cells $3_i$ that is deactivated may cyclically change from charging cycle to charging cycle.

The power converter circuit explained before can be implemented with electronic switches that have different voltage blocking capabilities. The second switch $31_1$ of the converter cell $3_1$ connected to the uppermost supply cell $2_1$ requires the highest voltage blocking capability, which is $V_2+V_n$ in the embodiment of FIG. 1. In general, the voltage blocking capability $V31_{MAXi}$ of a second switch $31_i$ is at least:

$$V31_{MAXi} = \sum_{k=i+1}^{n} V_k. \quad (4)$$

In the supply mode, the maximum voltage across the control switch $32_i$ of one converter cell is substantially the difference between the input voltage $V_i$ of the converter cell $3_i$ and the output voltage Vout. However, in the charging mode the maximum voltage across the control switches $32_i$ is higher and is dependent on the converter cell $3_i$ in which the control switch $32_i$ is implemented. For example, the maximum voltage $V32_{MAXi}$ across the control switch $32_i$ of the first converter cell $3_i$ is $(V_1+V_2+V_n)$−Vout=Vin−Vout. In general, the maximum (static) voltage $V32_{MAXi}$ across one control switch $32_i$ is substantially $$V32_{MAXi} = \sum_{k=i}^{n} V_k - Vout. \quad (5)$$

The maximum voltages across the freewheeling elements $34_i$ correspond to the output voltage Vout.

According to one embodiment, the supply circuit 2, the individual converter cells $3_1$-$3_n$, and, optionally the inductors $33_i$, are integrated in a first semiconductor chip, and the control circuit 4 is integrated in a second semiconductor chip. According to one embodiment, the control circuit 4 is implemented in a CMOS technology.

Figure 21:
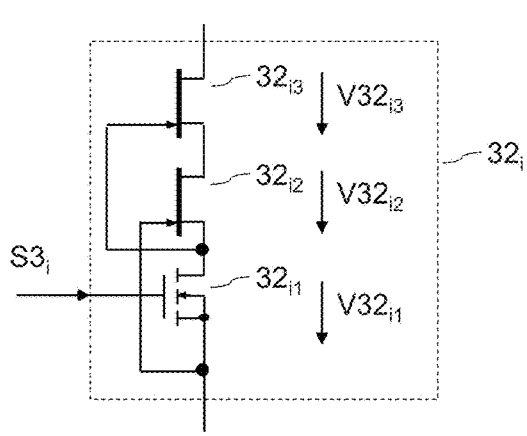
FIG. 21 illustrates one embodiment of a first switch in one of the plurality of converter cells.

According to one embodiment, the first switches $31_1$-$34_n$ of the individual converter cells $3_1$-$3_n$ are implemented using several switches (transistors) having a lower voltage blocking capability. FIG. 21 shows one embodiment of a second switch $32_i$. This second switch $32_i$ includes a first transistor $32_{i1}$ and at least one second transistor $32_{i2}$, $32_{i3}$, namely two second transistors $32_{i2}$, $32_{i3}$ in this embodiment. The first transistor $32_{i1}$ and the at least one second transistor $32_{i2}$, $32_{i3}$ are connected in series. The first transistor $32_{i1}$ receives the control signal $S3_i$ and switches on and off dependent on the control signal $S3_i$. The second transistors $32_{i2}$, $32_{i3}$ are connected such that each of these transistors receives as a drive voltage the load path voltage of the first transistor $32_{i1}$ or the load path voltage of another second transistor. In the present embodiment, the load path voltage of one of the first and second transistors is the drain-source voltage $V32_{i1}$, $V32_{i2}$, $V32_{i3}$ of the transistor, and the drive voltage is the gate-source voltage (the voltage between the gate and source terminals). In the present embodiment, a first one $32_{i2}$ of the second transistors receives as a drive voltage the load path voltage $V32_{i1}$ of the first transistor, and a second one $32_{i3}$ of the second transistors receives as a drive voltage the load path voltage $V32_{i2}$ of the second transistor $32_{i2}$.

The operation state of the first transistor $32_{i1}$ governs the operation state of the first switch $32_i$. That is, the first switch $32_i$ is switched on when the first transistor $32_{i1}$ is switched on, and the first switch $32_i$ is switched off, when the first transistor $32_{i1}$ switched off. The second transistors are configured such that transistor $32_{i2}$ switches off when the first transistor $32_{i1}$ switches off and a load path voltage of the first transistor $32_{i1}$ increases. When the transistor $32_{i2}$ switches off, the load path voltage of this transistor increases, so that transistor $32_{i3}$ is switched off. According to one embodiment, the first transistor $32_{i1}$ is implemented as an enhancement (normally-on) MOSFET and the second transistors $32_{i2}$, $32_{i3}$ are implemented as depletion (normally-on) MOSFETs or as Junction FETs (JFETs).

The overall voltage blocking capability of the second switch $32_i$ illustrated in FIG. 21 is dependent on the voltage blocking capabilities of the individual transistors $32_{i1}$-$32_{i3}$ connected in series and on the number of second transistors $32_{i2}$-$32_{i3}$ connected in series with the first transistor $32_{i1}$, wherein the voltage blocking capability increases as the number of transistors $32_{i2}$-$32_{i3}$ connected in series increases. Thus, by simply varying the number of second transistors $32_{i1}$-$32_{i3}$ connected in series with the first transistor $32_{i1}$ first switches $32_i$ with different voltage blocking capabilities can be realized.

Referring to the explanation above, in a power converter circuit as shown in FIG. 2, after the charging cycle the first input nodes $13_1$-$13_n$ of the individual converter cells $3_1$-$3_n$ have different electrical potentials. For example, an electrical potential $P13_1$ at the first input node $13_1$ of the upper most converter cell $3_1$ is Vin relative to the first ground potential (the electrical potential at the second input node 12). The electrical potential at the first input node $13_2$ of the first converter cell $3_2$ is Vin–$V_1$, and so on. In general, in a power converter circuit with n converter stages in which the capacitances of the first capacitors $22_1$-$22_n$ are selected such that the input voltages $V_1$-$V_n$ of the individual converter cells $3_1$-$3_n$ are substantially equal (Vin/n), the electrical potential $P13_i$ at the first input node $13_i$ of an arbitrary converter cell $3_i$ is given as:

$$P3_i = \frac{Vin}{n}(n+1-i). \quad (6)$$

If, for example, the converter cells $3_1$-$3_n$ are implemented with a buck converter topology as shown in FIG. 6 and the converter cells $3_1$-$3_n$, after one charging cycle, are activated in an order as shown in FIG. 12, voltages across the control switches ($32_i$ in FIG. 6) of the individual converter cells $3_1$-$3_n$ are different right before switching on the respective control switch. If, for example, the first ground potential (the electrical potential at the second input node 12) equals the second ground potential (the electrical potential at the second output node 18), the voltage across the control switch in the first converter cell $3_1$ is $$P13_1-Vout=Vin-Vout \quad (7a),$$

the voltage across the control switch of the second converter cell $3_2$ is $$\frac{(n-1)Vin}{n} - Vout, \quad (7b)$$

and so on. The voltage across the control switch $32_i$ right before switching on the control switch 32 affects the switching losses, whereas the switching losses are the higher, the higher the voltage across the control switch $32_i$ is before switching on the control switch. Furthermore, the higher the voltage across the control switch $32_i$ is before switching on, the more energy is required to obtain the zero voltage switching (ZVS) explained above.

Thus, it may be desirable to operate the power converter circuit such that the voltages across the control switches in the individual converter cells $3_1$-$3_n$ are as low as possible right before switching on the respective control switch.

Figure 22:
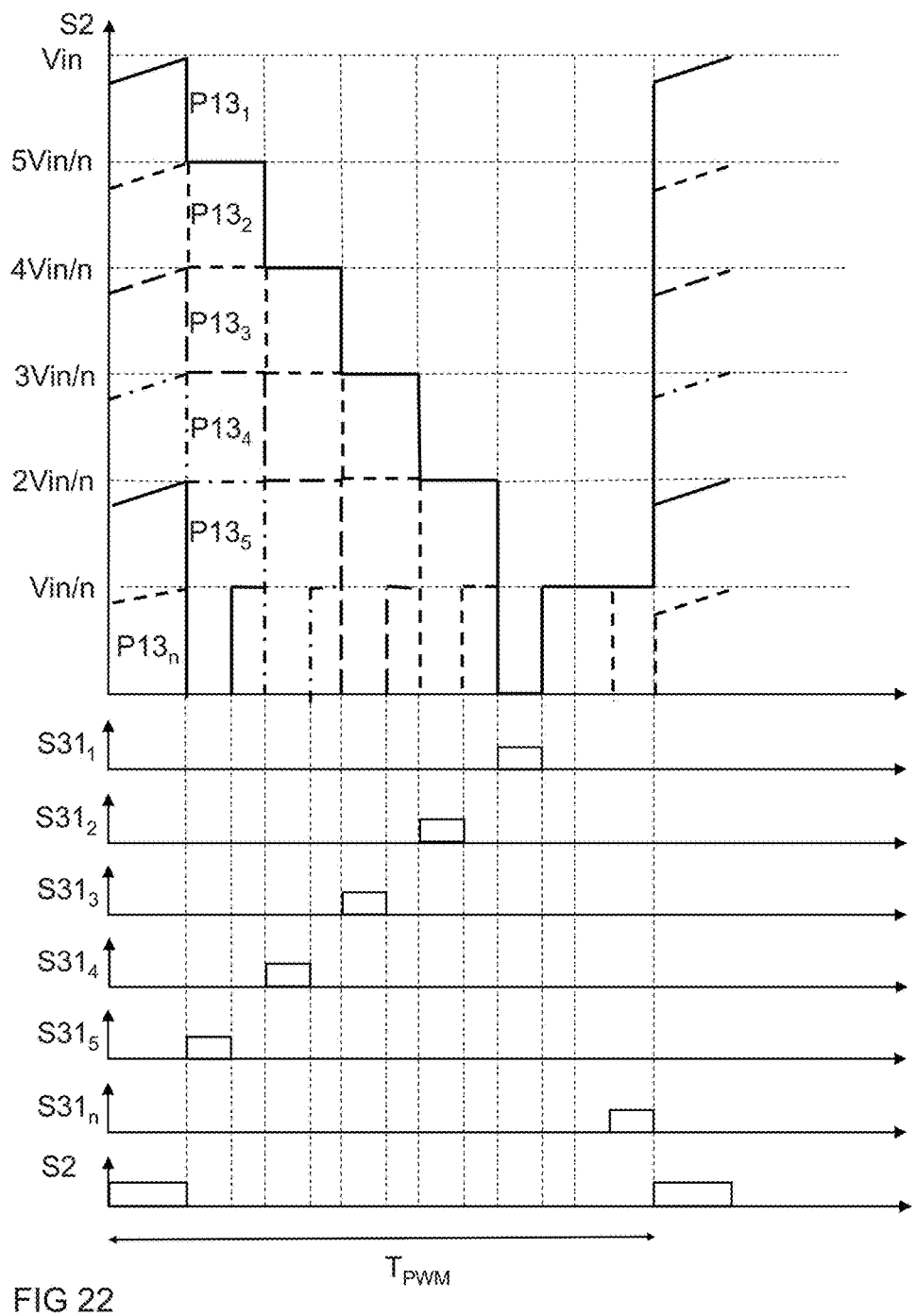
FIG. 22 illustrates one embodiment of a drive scheme of a power converter circuit with n=6 converter cells.

FIG. 22 illustrates one embodiment of a drive scheme that provides for lower voltages across the control switches of at least some of the converter cells $3_1$-$3_n$ than the drive scheme explained with reference to FIG. 12. The drive scheme shown in FIG. 22 is based on a power converter circuit of the type shown in FIG. 2, with n=6 converter cells. FIG. 22 shows timing diagrams of the supply circuit control signal S2, the ground switch control signals $S31_1$-$S31_n$, and the electrical potentials $P31_1$-$P31_n$ at the first input nodes $13_1$-$13_n$ of the individual converter cells $3_1$-$3_n$. The drive scheme shown in FIG. 22 has the effect that the voltage across the control switch of each converter cell but the lowermost converter cell $3_n$ is 2 Vin/n–Vout right before switching on the respective control switch, while the voltage across the control switch of the lowermost converter cell $3_n$ right before switching on the control switch is Vin/n–Vout.

The timing diagrams shown in FIG. 22 begin with the charging cycle. During the charging cycle, the first capacitors ($22_1$-$22_n$ in FIG. 2) in the supply circuit 2 are charged so that the voltages across these capacitors $22_1$-$22_n$ increase. Consequently, the electrical potentials $P13_1$-$P13_n$ at the first input nodes $13_1$-$1_n$ of the individual converter cells $3_1$-$3_n$ increase. Such increase is schematically shown in FIG. 22. At the end of the charging cycle, each of the electrical potentials $P13_1$-$P13_n$ at the first input nodes $13_1$-$13_n$ is given by equation (6).

The drive scheme shown in FIG. 22 is such that before switching on the control switch of some of the converter cells $3_1$-$3_n$, the electrical potential $P31_1$-$P31_n$ at the first input node is reduced by switching on the ground switch of at least one other converter cell. In this specific embodiment shown in FIG. 22, the electrical potentials $P31_1$-$P31_4$ at the first input nodes of converter cells $3_1$-$3_4$ are reduced by switching on the ground switch of at least one converter cell that is located between the respective converter cell and the second input node 12 and the second output node 18, respectively. This is explained in the following.

In the embodiment shown in FIG. 22, after the charging cycle, the converter cells are activated in the following order: $3_5$-$3_4$-$3_3$-$3_2$-$3_1$-$3_n$. According to one embodiment, "activating one converter cell" means switching on the ground switch ($31_1$-$31_n$) and the control switch ($32_i$ in FIG. 6) of the respective converter cell $3_1$-$3_n$. Each time one of the converter cells $3_2$-$3_5$ is activated, the electrical potential $P31_1$ at the first input node $13_1$ of the first converter cell $3_1$ decreases so that this electrical potential $P13_1$ has decreased to 2 Vin/n right before this converter cell $3_1$ is activated. Equivalently, the electrical potential $P13_2$ at the first input node $13_2$ of the second converter cell $3_2$ decreases each time one of the converter cells $3_3$-$3_5$ is activated so that this electrical potential $P13_2$ has decreased to 2 Vin/n right before this converter cell $3_2$ is activated, and so on. The electrical potential $P13_5$ at the first input node of the fifth converter cell (the converter cell adjacent the lowermost converter cell $3_n$) is 2 Vin/n right from after the charging cycle, and the electrical potential $P13_n$ at the first input node of the lower most converter cell $3_n$ is Vin/n right from after the charging cycle. In each case, after a converter cell has been activated, the electrical potential at the respective first input node $13_i$ remains at Vin/n (or lower as the respective capacitor $22_i$ may be discharged during the activation phase) until the next charging cycle.

Figure 23:
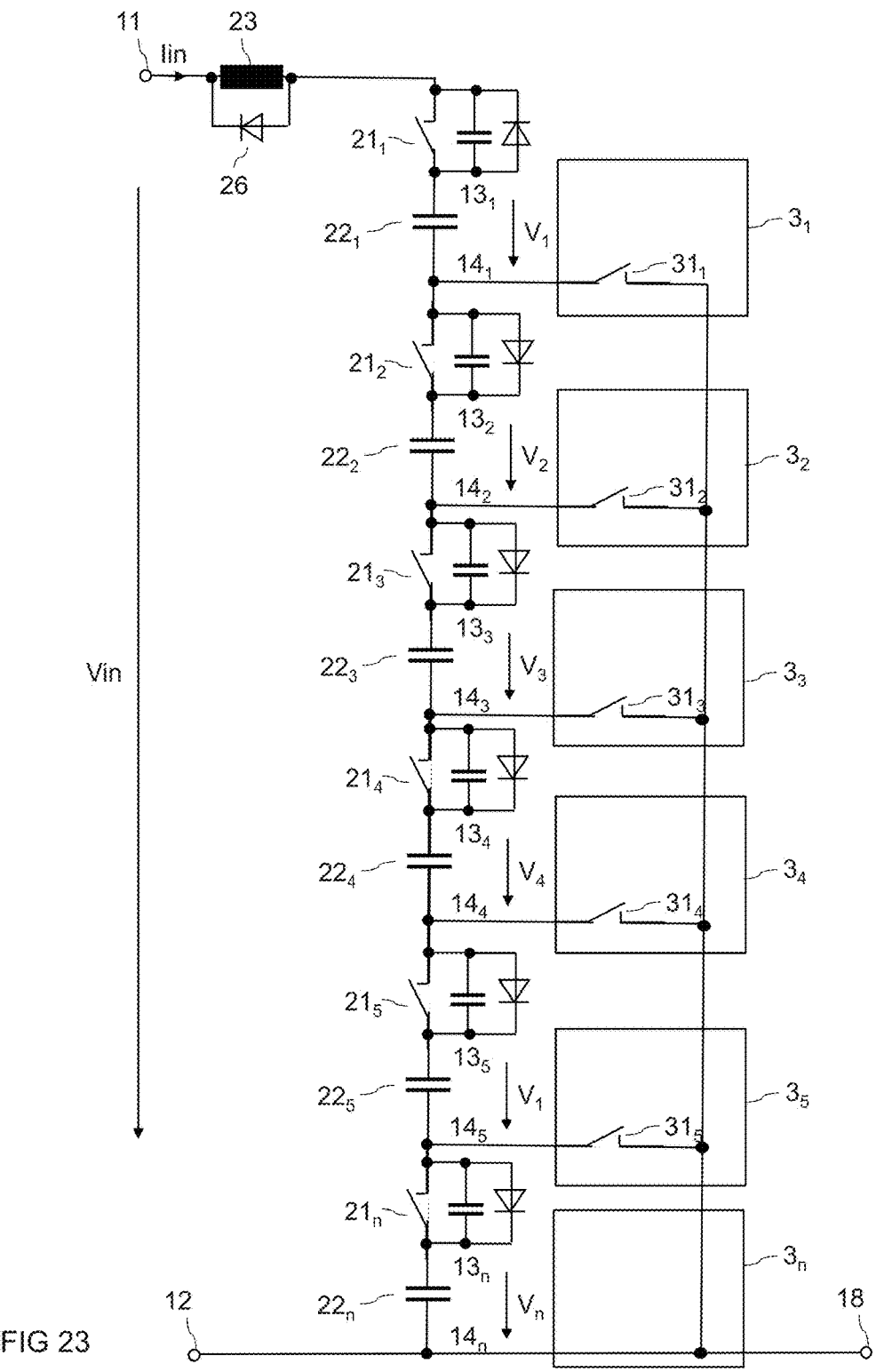
FIG. 23 shows the supply circuit and parts of the converter cells of a power converter circuit with n=6 converter cells.

The decrease of the electrical potential $P13_i$ at the first input node $13_i$ of an arbitrary converter cell $3_i$ by switching on the ground switch of another converter cell located between the converter cell $3_i$ and the lower most converter cell $3_n$ is explained with reference to FIG. 23 below. FIG. 23 only shows the supply circuit 2 in a power converter circuit with n=6 converter cells, the first and second input nodes $13_1$-$13_n$, $14_1$-$14_n$ and the ground switches $31_1$-$31_n$ of the respective converter cells. Referring to FIG. 23, each of the first switches $21_1$-$21_n$ of the supply circuit 2 has a parasitic capacitance in parallel with the actual switch. If, for example, the first switches $21_1$-$21_n$ are implemented as MOSFETs, these parasitic capacitances are drain-source capacitances of these MOSFETs. During the charging cycle, when the first switches are switched on, the first capacitors $22_1$-$22_n$ form a capacitive voltage divider between the first input node 11 and the second input node 12. During the charging cycle, the parasitic capacitances of the first switches $21_1$-$21_n$ are discharged.

After the charging cycle, the first capacitors $22_1$-$22_n$ and the parasitic capacitances of the first switches $21_1$-$21_n$ form a capacitive voltage divider between the first input node 11 and the second input node 12, wherein the converter cells $3_1$-$3_n$ may take energy from the individual capacitors $22_1$-$22_n$ and transfer the energy to the output.

Each time, the electrical potential of one circuit node in this capacitive voltage divider is pulled to ground by switching on one of the ground switches $31_1$-$31_5$, the electrical potentials $P13_i$ of first input nodes located between this circuit node and the first input node 11 are pulled down equivalently. For example, if, after the charging cycle, the electrical potential at the second input node $14_5$ of the converter cell $3_5$ is pulled down to ground by switching on the ground switch $31_5$ of this converter cell $3_5$, the electrical potential at this circuit node $14_5$ decreases from V to zero. Consequently, the electrical potentials at the first input nodes $13_1$, $13_2$, $13_3$, $13_4$ are reduced for Vn, with Vn being Vin/n if the input voltages $V_1$-$V_n$ after the charging cycle are substantially equal. After the ground switch $31_5$ is switched off (opened), the electrical potentials at the first input nodes $13_1$-$13_4$ are kept on these reduced levels. When the electrical potentials at these circuit nodes $13_1$-$13_4$ are pulled down, the voltage across the upper most first switch $21_1$ increases.

If the first switches $21_1$-$21_n$ are implemented as MOSFETs they include an internal diode (body diode) in parallel with the actual switch. These diodes are also shown in FIG. 23. According to one embodiment the uppermost first switch $21_1$ is connected such that the body diode is oriented as shown in FIG. 23. In this case, the cathode faces the first input node 11 so that, after the charging cycle, the electrical potential at the first input node $13_1$ of the uppermost (first) converter $3_1$ can fall below the electrical potential at the first input node 11 of the power converter circuit. The other first switches $21_2$-$21_n$ may be connected such that their body diodes are oriented opposite (back-to-back) to the orientation of the body diode in the first switch $21_1$. That is, the cathodes of the body diodes in these switches $21_2$-$21_n$ face the second input node 12 of the power converter circuit. Thus, these diodes prevent the capacitors $22_1$-$22_n$ from being discharged when ground switch other than the ground switch of the associated converter cell is closed. For example, if the ground switch $31_1$ of the first converter cell $31_1$ switches on, the polarity of the diodes in the first switches $21_2$-$21_n$ is such that the capacitors $22_2$-$22_n$ cannot be discharged via these diodes and the ground switch $31_1$.

In the embodiment shown in FIG. 22, the electrical potential at the first input node of each converter cell $3_1$-$3_4$ other than the lowermost converter cell $3_n$ and the converter cell directly adjacent the lowermost converter cell $3_n$ is reduced (pulled down) before activating the respective converter cell $3_1$-$3_4$. The converter cell directly adjacent the lowermost converter cell $3_n$ is converter cell $3_5$ in the embodiment shown in FIG. 23, and converter cell $3_{n-1}$ in general. Reducing the electrical potential at the first input node of one converter cell includes switching on the ground switch of another converter cell located between the respective converter cell and the lowermost converter cell $3_n$. In general, reducing the electrical potential at the first input node $13_i$ of one converter cell, with i being one of 1, 2, 3, 4 in the embodiment shown in FIG. 23, includes switching on the ground switch of at least one other converter cell $3_k$, with k being selected from i–1 to 5 in the embodiment shown in FIG. 23.

In the embodiment shown in FIG. 22, the lowermost converter cell $3_n$ is activated after the uppermost (first) converter cell $3_1$ and before the charging cycle. However, this is only an example. Activation of the lower most converter cell $3_n$ can be inserted at any position in the activation sequence. According to one embodiment (not shown) the lowermost converter cell $3_n$ is activated directly after the charging cycle. In this case, the charging cycle of a new activation sequence directly follows the activation period of the uppermost (first) converter cell $3_1$.

According to one embodiment, the activation periods of the individual converter cells $3_1$-$3_n$ do not overlap. That is, only one of the plurality of converter cells $3_1$-$3_n$ is activated at the same time. According to another embodiment, the lowermost converter cell $3_n$ is activated together with one of the other converter cells, that is, together with one of converter cells $3_1$-$3_{n-1}$.

Figure 24A:
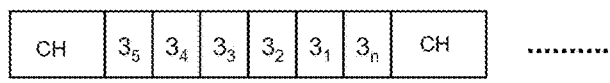
FIGS. 24A and 24B shows another representation of a drive scheme of the type shown in FIG. 22.
Figure 24B:
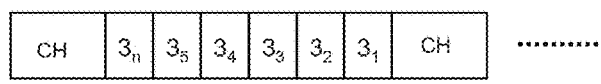

FIG. 24A is another representation of the drive scheme shown in FIG. 22. FIG. 24A illustrates the order in which the individual converter cells $3_1$-$3_n$ are activated after the charging cycle. This order is $3_5$-$3_4$-$3_3$-$3_2$-$3_1$-$3_n$ in the embodiment shown in FIG. 24A. FIG. 24B illustrates a modification of the drive scheme shown in FIGS. 22 and 24A. In this embodiment, the lowermost converter cell 3 is activated directly after the charging cycle so that a charging cycle of a successive drive sequence directly follows the activation period of the uppermost converter cell $3_1$. In FIGS. 24A and 24B, "CH" denotes the charging cycle.

Referring to the above, activating one $3_i$ of the plurality of converter cell may include operating the ground switch $31_i$ and the control switch $32_i$ of the respective converter cell $3_i$ in a PWM fashion, whereas the duty cycle may be controlled in the way explained above in order to control one of the output voltage Vout and the output current Iout. During one activation period, there may be one PWM drive cycle (one on-period) of the control switch $32_i$ or there may be several PWM drive cycles.

Figure 25:
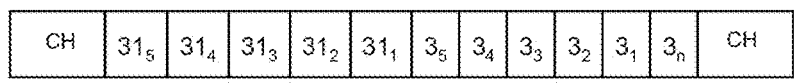
FIG. 25 illustrates another embodiment of a drive scheme of a power converter circuit with n=6 converter cells.

FIG. 25 illustrates another embodiment of a drive scheme. In this embodiment, after a charging cycle, there is a grounding sequence in which each of the ground switches is switched on once in order to ground the second input nodes $14_1$-$14_{n-1}$ so as to pull down the electrical potentials at the first input nodes $13_1$-$13_{n-1}$ to 2 Vin/n. After this grounding sequence, there is an activation sequence in which each of the converter cells $3_1$-$3_{n-1}$ is activated once, wherein activating a converter cell includes switching on the ground switch and the control switch of the respective converter cell. In the grounding sequence, the ground switches $31_1$-$31_{n-1}$ can be switched on in an arbitrary order, that is, the order of switching on these ground switches is not restricted to the order shown in FIG. 25. Furthermore, after the grounding sequence, the converter cells $3_1$-$3_n$ can be activated in an arbitrary order, that is, the order of activating the converter cells $3_1$-$3_n$ is not restricted to the order shown in FIG. 25. the converter cells The lowermost converter cell $3_n$ can be activated at any time in this sequence. In this embodiment, the electrical potential at the first input node $13_1$-$13_n$ of each converter cell $3_1$-$3_n$ is pulled to Vin/n in the grounding sequence.

The activation scheme shown in FIGS. 22 and 24 is such that the electrical potential at the first input node of each of the converter cells $3_1$-$3_4$ (in general, $3_1$-$3_{n-4}$) is pulled down to Vin/n before the respective converter cell is activated. However, this is only an example. Any reduction of the electrical potential at the first input node of one converter cell reduces the switching losses, although it may not result in the minimum losses. For example, if the driving scheme after the charging cycle is $3_5$-$3_1$-$3_2$-$3_3$-$3_4$-$3_n$ the electrical potentials at the first input nodes of the converter cells $3_1$, $3_2$, $3_3$, $3_4$ are reduced only once, namely for Vin/n.

Figure 26:
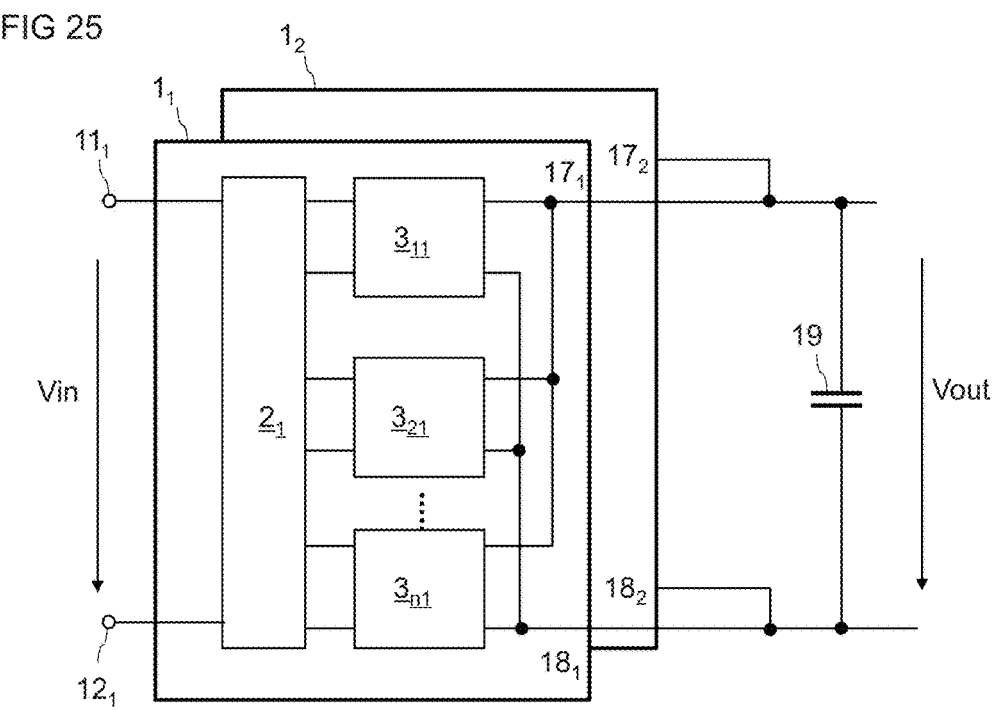
FIG. 26 shows one embodiment of an electronic circuit including two power converter circuits connected in parallel.

FIG. 26 shows one embodiment of an electronic circuit that includes two power converter circuits $1_1$, $1_2$. These power converter circuits 11, 12 are connected in parallel, that is, each of these power converter circuits $1_1$, $1_2$ receives the input voltage Vin at a respective input, and outputs of these power converter circuits $1_1$, $1_2$ are connected. In particular, first output nodes $17_1$, $17_2$ of these power converter circuits $1_1$, $1_2$ are connected, and second output nodes $18_1$, $18_2$ of these power converter circuits $1_1$, $1_2$ are connected. The optional output capacitor 19 is connected between the common first output node $17_1$, $17_2$ and the common second output node $18_1$, $18_2$. In the embodiment shown in FIG. 26, only a first power converter circuit $1_1$ is shown in detail. The second power converter circuit $1_2$ is implemented in the same way. According to one embodiment, the first power converter circuit $1_1$ and the second power converter circuit $1_2$ are implemented with the same number of converter cells.

FIG. 26 shows n1=3 converter cells in the first power converter circuit $1_1$. This, however, is only an example and for the purpose of explanation. In the following, $3_{11}$-$3_{n1}$ denote the converter cells of the first power converter circuit $1_1$, and $3_{12}$-$3_{n2}$ denote the converter cells of the second power converter circuit $1_2$, whereas $3_{n1}$ and $3_{n2}$ are the lowermost converter cells and $3_{11}$, $3_{12}$ are the uppermost (first) converter cells in each of these power converter circuits $1_1$, $1_2$. In each of the first power converter circuit $1_1$ and the second power converter circuit $1_2$, the individual converter cells can be activated, after the charging cycle, in one of the ways explained with reference to FIGS. 23-25 hereinbefore.

Figure 27:
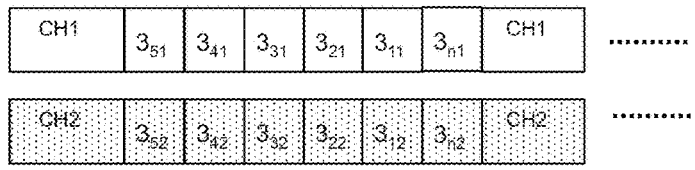
FIG. 27 illustrates an order in which converter cells in each of the power converter circuits shown in FIG. 26 may be activated.

FIG. 27 shows an activation scheme for the first power converter circuit $1_1$ that is based on the embodiment shown in FIG. 24, and an activating scheme for the second power converter circuit $1_2$ that is also based on the embodiment shown in FIG. 24. These activation schemes are based on a first power converter circuit $1_1$ with n1=6 converter cells and a second power converter circuit $1_2$ with n2=6 converter cells. These activation schemes can be performed successively. That is, first the first power converter circuit $1_1$ may be operated in accordance with the activation scheme shown in FIG. 27 and then the second power converter circuit $1_2$ may be operated in accordance with the activation scheme shown in FIG. 27. According to another embodiment, the activation schemes shown in FIG. 27 are interleaved.

Figure 28A:
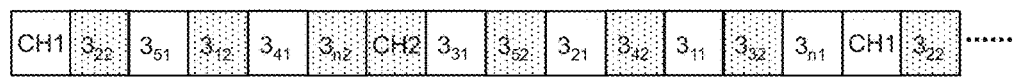
FIGS. 28A and 28B shows embodiments of drive schemes for the electronic circuit shown in FIG. 26.
Figure 28B:
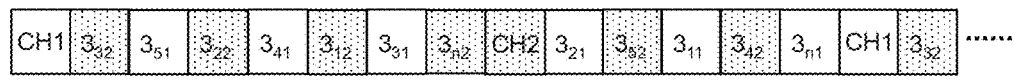

FIGS. 28A and 28B show two embodiments of how these activation schemes may be interleaved. At each time only one converter cell of either the first power converter circuit $1_1$ or the second power converter circuit $1_2$ is active, wherein the order in which the converter cells in each of the power converter circuits $1_1$, $1_2$ are activated is in accordance with FIG. 27. In the embodiment shown in FIGS. 28A and 28B converter cells in the first power converter circuit $1_1$ and converter cells in the second power converter circuit $1_2$ are activated alternatingly. However, this is only an example. It is also possible two activate two or more converter cells of one power converter circuit successively and then to activate two or more converter cells of the other power converter circuit successively.

Figure 29:
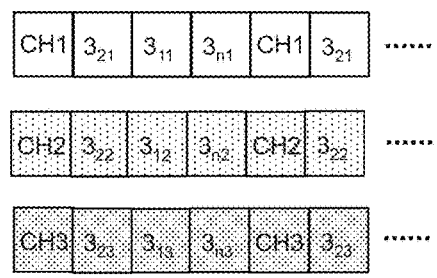
FIG. 29 illustrates an order in which converter cells in each of three parallel connected power converter circuits may be activated.
Figure 30:
FIG. 30 shows one embodiment of a drive scheme for an electronic circuit including three power converter circuits connected in parallel.

The embodiment shown in FIG. 26 is not restricted to have only two power converter circuits $1_1$, $1_2$ connected in parallel. According to another embodiment, three or more power converter circuits are connected in parallel. FIG. 29 shows activation schemes of three power converter circuits $1_1$, $1_2$, $1_3$, each including n=3 converter cells. In the following, $3_{11}$-$3_{n1}$ denote the converter cells of the first power converter circuit $1_1$, $3_{12}$-$3_{n2}$ denotes the converter cells of the second power converter circuit $1_2$ and $3_{13}$-$3_{n3}$ denotes the converter cells of a third power converter circuit $1_3$. The activation schemes shown in FIG. 29 can be performed successively. However, it is also possible, to interleave the individual activation schemes. FIG. 30 shows one embodiment of how these activation schemes can be interleaved.

Methods of how switching losses in one power converter circuit 1 or in several parallel connected power converter circuits $1_1$, $1_2$ can be reduced are explained with reference to FIGS. 22-30 herein above. FIG. 31 shows another embodiment of a method of how losses may be reduced. This method includes reducing an effective frequency at which the individual converter cells are activated after a charging cycle.

Figures 31A, 31B, 31C, 32:
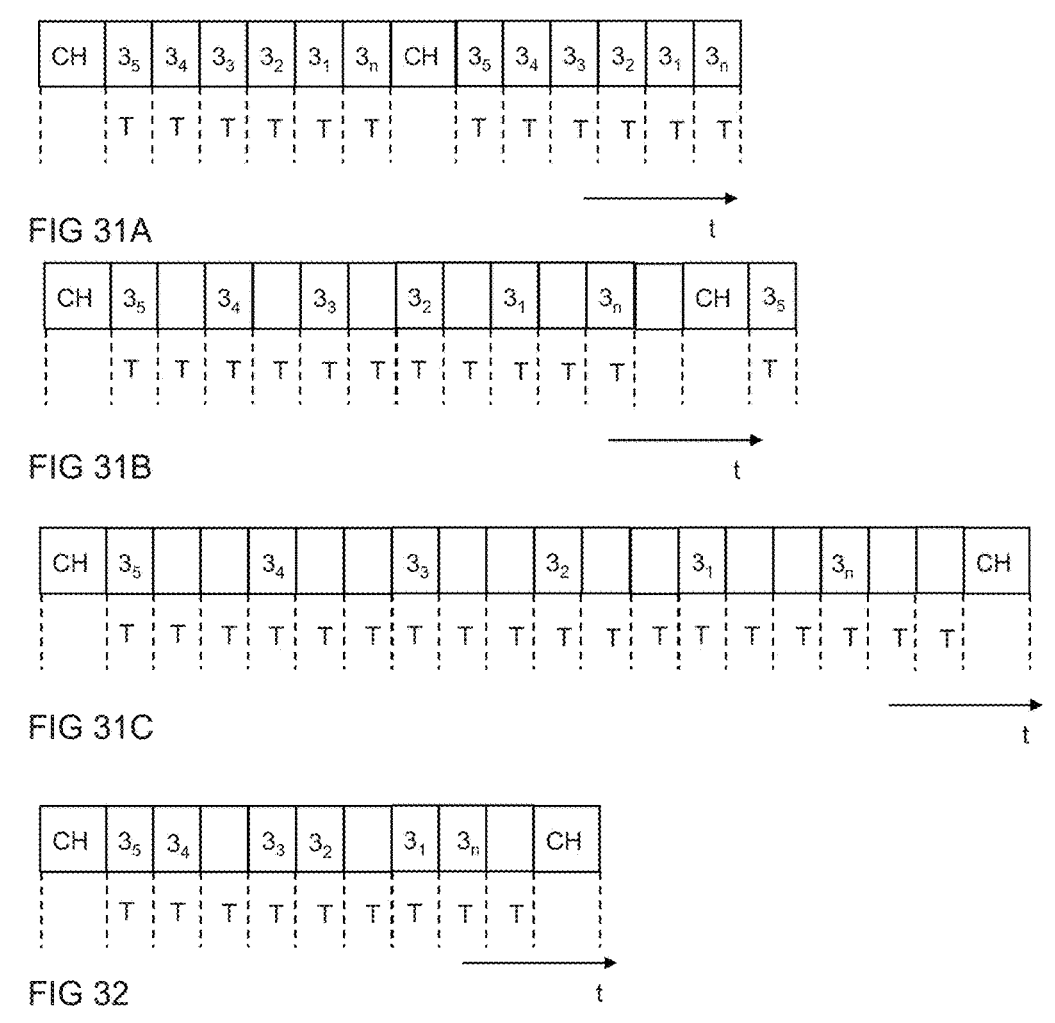

FIG. 31A shows the activation scheme under normal load (full load) conditions. In this embodiment, after a charging cycle, the individual converter cells are activated at an activation frequency $f_{act}$. During each time period, $T=1/f_{act}$ one of the converter cells is active, that is, transfers electrical power from the respective supply cell to the output. In the active state the control switch (32 in FIGS. 6 and 9) in the respective converter cell $3_i$ is operated in a PWM fashion, wherein there is at least one drive cycle in each activation state. As explained before, the duty cycle is dependent on the desired (average) output power of the converter cell. In the embodiment shown in FIG. 31A, only one converter cell is active at one time. The duration of the charging cycle, which is labeled as CH in FIG. 31A, may correspond to the duration of one activation period T or may be different therefrom.

The order in which the individual converter cells are activated, can be one of the orders explained hereinbefore. The specific order shown in FIG. 31A, which corresponds to the order explained with reference to FIG. 24, is only an example. The power converter circuit, in particular the converter cells, can be implemented with any of the topologies explained herein before.

According to one embodiment, the activation frequency $f_{act}$ is dependent on at least one of the output power and the output current Iout of the power converter circuit, wherein the activation frequency $f_{act}$ decreases as the at least one of the output power and the output current Iout decreases. In the embodiment shown in FIG. 31, the activation frequency $f_{act}$ is given be $f_{act}=1/T$, wherein T is one activation period. According to one embodiment, decreasing the activation frequency involves inserting time periods T in which none of the converter cells is active. The duration of these time periods may correspond to the duration of activation periods (in which a converter cell is active). These time periods will be referred to as pause periods in the following.

FIG. 31B shows one embodiment in which one pause period is inserted after every activation period so as to reduce the activation frequency $f_{act}$ to $f_{act}=\frac{1}{2}T$, which 50% as compared to the normal mode shown in FIG. 31A. Another embodiment, shown in FIG. 31C, includes inserting two pause periods after each activation period so as to reduce the activation frequency to $f_{act}=\frac{1}{3}T$, which is 33% as compared to the normal mode.

FIG. 32 shows yet another embodiment of a drive scheme. In this embodiment, one pause period is inserted after two directly successive activation period. In this case, the effective activation frequency is $f_{act}=\frac{2}{3}T$, which is 66% of the activation frequency in the normal mode shown in FIG. 31A.

In the description hereinbefore, directional terminology, such as "top," "bottom," "front," "back," "leading," "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

What is claimed is:

1. A method comprising:
    converting power by a power converter circuit that comprises a plurality of converter cells coupled to a supply circuit, the supply circuit comprising a first plurality of capacitors connected in series between input nodes of the power converter circuit, wherein converting power comprises successively activating each converter cell of the plurality of converter cells in a drive cycle at an activation frequency, wherein each converter cell of the plurality of converter cells is activated one at a time; and
    adjusting the activation frequency dependent on at least one of an output power or an output current of the power converter circuit, wherein adjusting the activation frequency comprises changing a pause period between at least two of the successive activations of the plurality of converter cells in the drive cycle, and none of the converter cells of the plurality of converter cells are activated during the pause period, wherein
    changing the pause period comprises changing a number of predetermined time periods T between each successive activation in which none of the plurality of converter cells is active, and
    activating each converter cell of the plurality of converter cells comprises activating each of converter cell of the plurality of converter cells for the predetermined time period T.

2. The method of claim 1, wherein the activation frequency decreases as the at least one of the output power or the output current decreases.

3. The method of claim 1, wherein the supply circuit further comprises:
    a second plurality of capacitors, wherein each of the second plurality of capacitors is coupled to one of the first plurality of capacitors, and wherein each of the plurality of converter cells is connected to one of the plurality of second capacitors.

4. The method of claim 1, wherein each of the plurality of converter cells comprises a buck converter topology.

5. The method of claim 1, wherein at least some of the plurality of converter cells include a ground switch connected between a converter cell input node and a ground node.

6. The method of claim 1, further comprising charging the supply circuit in a charging cycle.

7. The method of claim 1, wherein the number of predetermined of time periods T is zero when each converter cell of the plurality of converter cells is operated at a highest activation frequency.

8. A power converter circuit, comprising:
    a plurality of converter cells coupled to a supply circuit, the supply circuit comprising a first plurality of capacitors connected in series between input nodes of the power converter circuit; and
    a control circuit, wherein the control circuit is configured to
        successively activate each converter cell of the plurality of converter cells in a drive cycle at an activation frequency, wherein each converter cell of the plurality of converter cells is activated one at a time,
        adjust the activation frequency dependent on at least one of an output power or an output current of the power converter circuit, wherein
            the activation frequency is adjusted by changing a pause period between at least two of the successive activations of the plurality of converter cells in the drive cycle,
            none of the converter cells of the plurality of converter cells are activated during the pause period,
            the control circuit is configured to change the pause period by changing a number of predetermined time periods T between each successive activation in which none of the plurality of converter cells is active, and
            the control circuit is configured to activate each converter cell of the plurality of converter cells for the predetermined time period T.

9. The power converter circuit of claim 8, wherein the control circuit is configured to decrease the activation frequency as the at least one of the output power or the output current decreases.

10. The power converter circuit of claim 8, wherein the supply circuit further comprises:

a second plurality of capacitors, wherein each of the second plurality of capacitors coupled to one of the first plurality of capacitors, and wherein each of the plurality of converter cells is connected to one of the plurality of second capacitors.

11. The power converter circuit of claim 8, wherein each of the plurality of converter cells comprises a buck converter topology.

12. The power converter circuit of claim 8, wherein at least some of the plurality of converter cells include a ground switch connected between a converter cell input node and a ground node.

13. The power converter circuit of claim 8, wherein the control circuit is further configured to charge the supply circuit in a charging cycle.

14. The power converter circuit of claim 8, wherein the number of predetermined of time periods T is zero when each converter cell of the plurality of converter cells is operated at a highest activation frequency.

* * * * *